(12) United States Patent  (10) Patent No.: US 8,010,556 B2
Terrill et al.  (45) Date of Patent: Aug. 30, 2011

(54) SYSTEM AND METHOD FOR PROVIDING A SEARCH FEATURE IN A NETWORK ENVIRONMENT

(75) Inventors: Chris S. Terrill, Dallas, TX (US); Todd W. Kirby, Dallas, TX (US)

(73) Assignee: Match.com, L.L.C., Dallas, TX (US)

( * ) Notice: Subject to any disclaimer, the term of this patent is extended or adjusted under 35 U.S.C. 154(b) by 0 days.

(21) Appl. No.: 12/566,472

(22) Filed: Sep. 24, 2009

(65) Prior Publication Data

US 2010/0017375 A1    Jan. 21, 2010

Related U.S. Application Data

(63) Continuation of application No. 11/237,490, filed on Sep. 27, 2005, now Pat. No. 7,613,706.

(51) Int. Cl.
*G06F 7/00* (2006.01)
*G06F 17/30* (2006.01)

(52) U.S. Cl. ........................................ 707/770; 715/751

(58) Field of Classification Search .......... 707/600–831; 709/203, 204, 217, 219; 715/752, 753, 758, 715/762
See application file for complete search history.

(56) References Cited

U.S. PATENT DOCUMENTS

| | | | |
|---|---|---|---|
| 4,173,016 A | 10/1979 | Dickson | |
| 4,789,907 A | 12/1988 | Fischetti et al. | |
| 5,086,394 A | 2/1992 | Shapira | |
| 5,164,897 A | 11/1992 | Clark et al. | |
| 5,305,195 A | 4/1994 | Murphy | |
| 5,606,361 A | 2/1997 | Davidsohn et al. | |
| 5,623,660 A | 4/1997 | Josephson | |
| 5,681,046 A | 10/1997 | Lawrence | |
| 5,694,464 A | 12/1997 | Mashinsky | |
| 5,696,981 A | 12/1997 | Shovers | |
| 5,775,695 A | 7/1998 | Byers | |
| 5,818,836 A | 10/1998 | DuVal | |
| 5,832,432 A | 11/1998 | Trader et al. | |
| 5,835,087 A | 11/1998 | Herz et al. | |
| 5,850,428 A | 12/1998 | Day | |
| 5,862,223 A | 1/1999 | Walker et al. | |
| 5,884,270 A | 3/1999 | Walker et al. | |
| 5,907,677 A | 5/1999 | Glenn et al. | |

(Continued)

FOREIGN PATENT DOCUMENTS

DE    3508448 A1    3/1985

(Continued)

OTHER PUBLICATIONS

Supjarerndee et al, Recruitment filtering with personality-job fit model, Apr. 8-10, 2002, IEEE, 6 pages.*

(Continued)

*Primary Examiner* — Jean B Fleurantin
(74) *Attorney, Agent, or Firm* — Patent Capital Group

(57) ABSTRACT

An apparatus for providing a feature in a network environment is provided that includes a central web site operable to interface with one or more end users and to manage information related to one or more of the end users. The central web site is operable to populate a queue of a first end user with a profile of a second end user. The central web site includes a search component that, once the first end user has reviewed the profile, allows the first end user to search for one or more other end users using specified criteria.

21 Claims, 70 Drawing Sheets

U.S. PATENT DOCUMENTS

| | | | |
|---|---|---|---|
| 5,909,670 A | 6/1999 | Trader et al. | |
| 5,950,200 A | 9/1999 | Sudai et al. | |
| 5,956,716 A | 9/1999 | Kenner et al. | |
| 5,963,951 A | 10/1999 | Collins | |
| 5,996,006 A | 11/1999 | Speicher | |
| 6,148,067 A | 11/2000 | Leipow | |
| 6,181,867 B1 | 1/2001 | Kenner et al. | |
| 6,185,532 B1 | 2/2001 | Lemaire et al. | |
| 6,202,055 B1 | 3/2001 | Houvener et al. | |
| 6,253,188 B1 | 6/2001 | Witek et al. | |
| 6,272,467 B1 | 8/2001 | Durand et al. | |
| 6,356,893 B1 | 3/2002 | Itakura et al. | |
| 6,480,885 B1 | 11/2002 | Olivier | |
| 6,643,681 B1 | 11/2003 | Saito et al. | |
| 6,647,355 B2 | 11/2003 | Heinberg et al. | |
| 6,658,391 B1 | 12/2003 | Williams et al. | |
| 6,735,568 B1 | 5/2004 | Buckwalter et al. | |
| 6,775,775 B1 | 8/2004 | Yoshiura et al. | |
| 6,857,024 B1 | 2/2005 | Chen et al. | |
| 6,868,160 B1 | 3/2005 | Raji | |
| 6,873,693 B1 | 3/2005 | Langseth et al. | |
| 7,043,443 B1 | 5/2006 | Firestone | |
| 7,069,308 B2 | 6/2006 | Abrams | |
| 7,085,806 B1 | 8/2006 | Shapira | |
| 7,092,952 B1 | 8/2006 | Wilens | |
| 7,117,254 B2 | 10/2006 | Lunt et al. | |
| 7,188,153 B2 | 3/2007 | Lunt et al. | |
| 7,203,674 B2 | 4/2007 | Cohen | |
| 7,246,067 B2 | 7/2007 | Austin et al. | |
| 7,254,406 B2 | 8/2007 | Beros et al. | |
| 7,264,474 B2 | 9/2007 | Sullivan et al. | |
| 7,277,888 B2 | 10/2007 | Gelormine et al. | |
| 7,342,503 B1 | 3/2008 | Light et al. | |
| 7,394,388 B1 | 7/2008 | Light et al. | |
| 7,401,098 B2 | 7/2008 | Baker | |
| 7,617,134 B2 | 11/2009 | Terrill et al. | |
| 2001/0031454 A1* | 10/2001 | Mintz | 434/322 |
| 2001/0048449 A1 | 12/2001 | Baker | |
| 2002/0045154 A1 | 4/2002 | Wood et al. | |
| 2002/0059369 A1 | 5/2002 | Kern et al. | |
| 2002/0091556 A1 | 7/2002 | Fiala et al. | |
| 2002/0178057 A1 | 11/2002 | Bertram et al. | |
| 2004/0093334 A1 | 5/2004 | Scherer | |
| 2004/0128148 A1 | 7/2004 | Austin et al. | |
| 2004/0167794 A1 | 8/2004 | Shostack et al. | |
| 2004/0210661 A1 | 10/2004 | Thompson | |
| 2004/0249811 A1 | 12/2004 | Shostack et al. | |
| 2004/0260781 A1 | 12/2004 | Shostack et al. | |
| 2005/0038876 A1 | 2/2005 | Chaudhuri | |
| 2005/0060183 A1 | 3/2005 | Haupt | |
| 2005/0153678 A1 | 7/2005 | Tiberi | |
| 2005/0177528 A1 | 8/2005 | Qamar | |
| 2006/0041401 A1 | 2/2006 | Johnston | |
| 2006/0059130 A1 | 3/2006 | Weiss et al. | |
| 2006/0059142 A1* | 3/2006 | Zvinyatskovsky et al. | 707/5 |
| 2006/0059147 A1 | 3/2006 | Weiss et al. | |
| 2006/0059159 A1 | 3/2006 | Truong et al. | |
| 2006/0106667 A1 | 5/2006 | Coyne | |
| 2006/0121426 A1 | 6/2006 | Scoresby et al. | |
| 2006/0126095 A1 | 6/2006 | Tamura et al. | |
| 2006/0136498 A1 | 6/2006 | Insley | |
| 2006/0149625 A1 | 7/2006 | Koningstein | |
| 2006/0179111 A1 | 8/2006 | Verona | |
| 2006/0287928 A1 | 12/2006 | Terrill et al. | |
| 2007/0030824 A1 | 2/2007 | Ribaudo et al. | |
| 2007/0031800 A1 | 2/2007 | Solomon | |
| 2007/0032240 A1 | 2/2007 | Finnegan et al. | |
| 2007/0050354 A1 | 3/2007 | Rosenberg | |
| 2007/0069901 A1 | 3/2007 | Tuck et al. | |
| 2007/0072468 A1 | 3/2007 | Terrill et al. | |
| 2007/0073548 A1 | 3/2007 | Terrill et al. | |
| 2007/0073549 A1 | 3/2007 | Terrill et al. | |
| 2007/0073687 A1 | 3/2007 | Terrill et al. | |
| 2007/0073710 A1 | 3/2007 | Terrill et al. | |
| 2007/0073711 A1 | 3/2007 | Terrill et al. | |
| 2007/0073802 A1 | 3/2007 | Terrill et al. | |
| 2007/0073803 A1 | 3/2007 | Terrill et al. | |
| 2007/0112762 A1 | 5/2007 | Brubaker | |
| 2007/0162458 A1 | 7/2007 | Fasciano | |
| 2007/0233730 A1 | 10/2007 | Johnston | |
| 2008/0059217 A1 | 3/2008 | Austin et al. | |
| 2008/0222535 A1 | 9/2008 | Zrike et al. | |
| 2008/0301557 A1 | 12/2008 | Kotlyar | |
| 2010/0017469 A1 | 1/2010 | Terrill et al. | |
| 2010/0077032 A1 | 3/2010 | Drennan et al. | |
| 2010/0125530 A1 | 5/2010 | Terrill et al. | |

FOREIGN PATENT DOCUMENTS

| | | |
|---|---|---|
| EP | 0148406 B1 | 3/1989 |
| EP | 0649121 B1 | 1/2000 |
| WO | WO 02/13053 A2 | 2/2002 |

OTHER PUBLICATIONS

Wilson et al., Design guidelines for parallel algorithms using continuous job profiles, Apr. 30-May 2, 1991, IEEE, 30-36.*

Factiva, "MicroVoice, InterStep offer personals," Seybold Report on Publishing Systems, vol. 25, No. 21, 2 pages, Jul. 29, 1997.

Factiva, "IBM Teams with Electric Classifieds," Seybold Report on Publishing Systems, vol. 25, No. 21, 1 page, Jul. 29, 1996.

Neil Marks, "Home Alone and Wired for Romance," The Mail on Sunday, 1 page, May 19, 1996.

Mitch Ratcliffe, Write once, publish many times: Electric Classifieds Inc.'s flexible publishing technology (middleware for online publishing), Digital Media, vol. 5, No. 3, ISSN: 1056-7038, 4 pages, Aug. 7, 1995.

Factiva, "Desktop Video: VDOLive Will Enable Motion Video on the Internet; Conquers Internet's Technical Challenges & Will Make Desktop Video Broadcasting Applications Possible," Edge, 2 pages, Nov. 6, 1995.

Factiva, "Electronic Classifieds: U S West Marketing Resources Teams with Denver's Rocky Mountain News," Edge, vol. 9, No. 323, ISSN: 0890-9563, 2 pages, Oct. 3, 1994.

Ric Manning, "Singles Use Newest Approach: Multimedia," Louisville Courier-Journal, 2 pages, May 3, 1994.

Factiva, "Nexpo '96 Preview: Something for Everyone in Las Vegas, part 6," Seybold Report on Publishing Systems, vol. 25, No. 17, 3 pages, May 31, 1996.

Marco R. Della Cava, "Truth in advertising hits Internet dating; Services help potential mates spot scammers," USA Today, ProQuest #62115951, 6 pages, Apr. 20, 2004.

LookBetterOnline: Internet Archive Wayback Machine; www.archive.org; collection of web pages from http://lookbetteronline.com, 23 pages, May 19, 2004, Jun. 14, 2004.

Notification of Transmittal of the International Search Report and the Written Opinion of the International Search Authority, or the Declaration (3 pages); Written Opinion of the International Searching Authority (5 pages), and International Search Report (4 pages) for International Application No. PCT/US 06/23518 mailed May 21, 2008.

Microsoft, "Immedient Improves and Streamlines Hiring with Microsoft Office Solution Accelerator for Recruiting," Published Sep. 2003, 4 pages.

Drogehorn et al., Personalised applications and services for a mobile user, Apr. 4-8, 2005, IEEE, 473-479 (7 pages).

Chen Zhou et al., DAML-QoS ontology for Web services, Jul. 6-9, 2004, IEEE 472-479 (8 pages).

U.S. Appl. No. 12/266,730, filed Nov. 7, 2008, entitled "System and Method for Providing a Near Matches Feature in a Network Environment," Inventor(s) Francisco J. Bonilla et al.

U.S. Appl. No. 12/690,688, filed Jan. 20, 2010, entitled "System and Method for Providing Enhanced Questions for Matching in a Network Environment," Inventor(s) Chris S. Terrill, et al. all pages.

Foner, L., "A Multi-Agent Referral System for Matchmaking," MIT Media Lab, 1996, (8 pages).

* cited by examiner

*FIG. 2C*

*FIG. 2E* match.com.  My Match | Search | My Profile | Email | Advice:

Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [ ]
Choose a password: [ ]
Your email address: [ ]
I am a:  ○ Man  ○ Woman
Seeking:  ○ Man  ○ Woman
Between ages: [25 ▼] and [33 ▼]
Your birthday: [Month ▼] [Day ▼] [Year ▼]
Your country: [United States ▼]
Zip / postal code: [ ]
Where did you hear about Match.com: [Choose below ▼] (Optional)

☑ Send me photos of my compatible matches. By checking this box, I also consent to receive from Match.com special offers and promotions relating to Match.com and select third parties, as well as tips and announcements on how I can better use the Match.com service.

☐ Send me special offers and partner promotions. Receive exclusive deals and timely updates sent to you by select Match.com partners.

I am at least 18 years old and have read and agree to Match.com's terms of use and privacy policy.

[Continue ▷]

*FIG. 2F* match.com close window

LadyDi520

Active within 24 hours    New

Basics

"Looking for my Knight is Shining Armor"

| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

About me and who I'd like to meet

I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!

Appearance

| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests for fun:

I love to have a good time at whatever I am doing. I love to laugh I love to smile and I am looking for that someone that can make that happen, it hasn't for a LONG time.

FROM FIG. 2F favorite hot spots:
I love Olive Garden (cheap date) LOL then karokee, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I use to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer | pets:

| | |
|---|---|
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2G

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |

Fun

Boot scootin' across gritty floorboards, the band playing what we'll soon remember as "our song"

Photos

FROM FIG. 3A

| Height: 6'3" (190.5 cms) |
|---|
| Eyes: Brown |
| Build: Athletic/toned |
| Hair Color: Blonde |
| Full Profile |

Profile Summary

I'm a big believer in working hard and playing hard. Those who know me best appreciate my spontaneity, honesty, grin and ability to turn the ordinary into something great. Having a balance is important to me, and this shines through in not only my love for sports and hanging out with buddies, but also in my appreciation for the finer things in life. There are a million ways to describe the perfect match, but what I'm looking for is someone who appreciates the thousands of daily niceties that go into making a relationship work. I want a teammate, a best friend, someone to walk beside and behind and one in which our shared laughter gets us through the good times and bad.

| | |
|---|---|
| Looking for: | 25 to 45 year old Woman within 50 miles of Denver, Colorado |
| Relationship history: | Single (never been married) |
| Ethnic background: | White/Caucasian |
| Body type: | Athletic/toned |
| Height: | 6'3" (190.5 cms) |

*FIG. 3B*

FIG. 4A chemistry

| Home | New Matches | My Account | Archives | My Personality Profile |

Home  Help  Your Profile  Archives  Sign Out

| Summary | My Profile | Interested in You | Active Matches | Email |

Summary  My Profile  Archives  My Personality Profile

Hello Todd,
Welcome to your Personality Profile.
The following analysis is based on your responses to our questionnaire. Your results identify your major and minor personality types, as well as the types with whom you're likely to be compatible.

Your Major and Minor Personality Types

Characteristics of all four personality types can be found within each of us, but there is almost always one personality type that is dominant. We call this the major personality type.

The test also identifies your minor or secondary personality type. You exhibit some aspects of this personality type, though not to the same degree as with your major type.

- Your major personality type = DIRECTOR
- Your minor personality type = explorer

You are a DIRECTOR/explorer

You are courageous; and you seek challenges. You are a tough-minded, independent and daring thinker who likes to explore ideas or problems thoroughly. You focus easily. And you are persistent, systematic and competent in pursuing your interests and goals.

You are also assertive; and you enjoy the opportunities your hard work wins.

E - Explorer - 25%   N - Negotiator - 25%
B - Builder - 22%    D - Director - 26%

FROM FIG. 4A

You have a lot of energy. You think quickly, make decisions more easily than most, dislike unnecessary rules, and take a rational approach to people, issues and ideas.

You don't often enjoy "small talk." You are generally not interested in pleasing boring people and you gravitate to men and women who are intellectually exciting and get to their point quickly during conversations.

You are not conventional in most of your attitudes and values. You tend to be irreverant and pragmatic and you like spontaneous people. You can be an exciting, yet hard driving and exacting, friend and companion.

How your personality breaks out

Explorer - 25% of your personality
Known for high energy and high creativity. Seeks novelty, risk and pleasure. Intellectually curious and not easily swayed by opininon.

Builder - 22% of your personality
Usually very popular. Deep attachment to home and family. Calm demeanor, low anxiety. Often focused on achieving financial security.

Negotiator - 25% of your personality
Excels at seeing the big picture, long-term planning, and consensus building. Quick witted. An intuitive thinker. Imaginative and nurturing.

Director - 26% of your personality
Skilled at abstract thinking and short-term planning. Often assertive and quite competitive. Interested in rank and status. Easily makes people laugh.

Universal Personality Traits
A globally accepted consensus of the five basic personality traits.

| You | | Matched with | Compatibility Rating |
|---|---|---|---|
| D/e | ↔ | E | ☆☆ |
| D/e | ↔ | B | ☆☆ |
| D/e | ↔ | N | ☆☆ |
| D/e | ↔ | D | ☆☆ |

People with a HIGH degree of the following traits generally get along will with the personality types highlighted below.

FROM FIG. 4B

Extravert
Friendly, talkative and outgoing. Often takes on leadership roles. Comfortable around others, especially large groups.

You ▽  [E] [B] [N] [D]

Agreeable
Easygoing in nature. Can be tolerant and accommodating of others. Interested in creating harmony and building consensus.

You ▽  [E] [B] [N] [D]

Conscientious
Determined to meet or exceed stated goals. Disciplined and extremely focused at work. Not easily distracted.

You ▽  [E] [B] [N] [D]

Open to New Experiences
Interested in innovation, experimentation and new solutions. Willing to try new experiences. Creative, original thinker.

You ▽  [E] [B] [N] [D]

Emotional Stability
Strong and steady, not easily upset. Level-headed in response to unforeseen changes or problems. Calm, cool and collected.

You ▽  [E] [B] [N] [D]

FIG. 5 chemistry

Home    Help    Your Profile    Archives    Sign Out

| Home | New Matches | My Account | Archives | My Personality Profile |

Summary  My Profile  Interested in You  Active Matches  Email

Welcome Back Todd

Will this be the day you find that someone special? Find out here - preview your new matches, find out who is interested in you, learn more about your active matches, and build ongoing relationships through email.

New Matches
2 New Matches
View profiles custom-selected for you based on your Personality Profile and your interests. more...
[Go]

Interested in You
0 New Matches
See who has reviewed your profile and expressed interest in getting to know you better. more...
[Go]

Active Matches
14 New Alerts
Exchange information via our four-stage communication process. more...
[Go]

Email
1 New Message
Send and receive messages through our two-way anonymous email system. more...
[Go]

We Need Your Help
Welcome to the beta version of our site. Over the next few weeks, we will use your feedback to improve the way it works and the way it looks. Take a moment to let us know what you think. more...

Put Your Best Foot Forward
Expert advice on creating the perfect profile, selecting the right photo, and what to say - and not say - in that first email. more...

"INTERESTED IN YOU" COMPONENT

| NEW MATCHES | NEW MATCHES |
|---|---|
| TODD | BROOKE |
| 1. MARSHELL<br>X 2. BROOKE<br>3. PAM<br>4. ALISA<br>5. ALAINA | 1. JAY<br>2. THOMAS<br>3. CHRIS<br>4. ALEX<br>5. KEVIN |
| 6. MICHELLE<br>7. ROSEANNE<br>8. DONNA<br>9. MARY<br>10. CANDACE | 6. JIM<br>7. BILL<br>X 8. TODD<br>9. BOB<br>10. CHET |

*FIG. 6C*

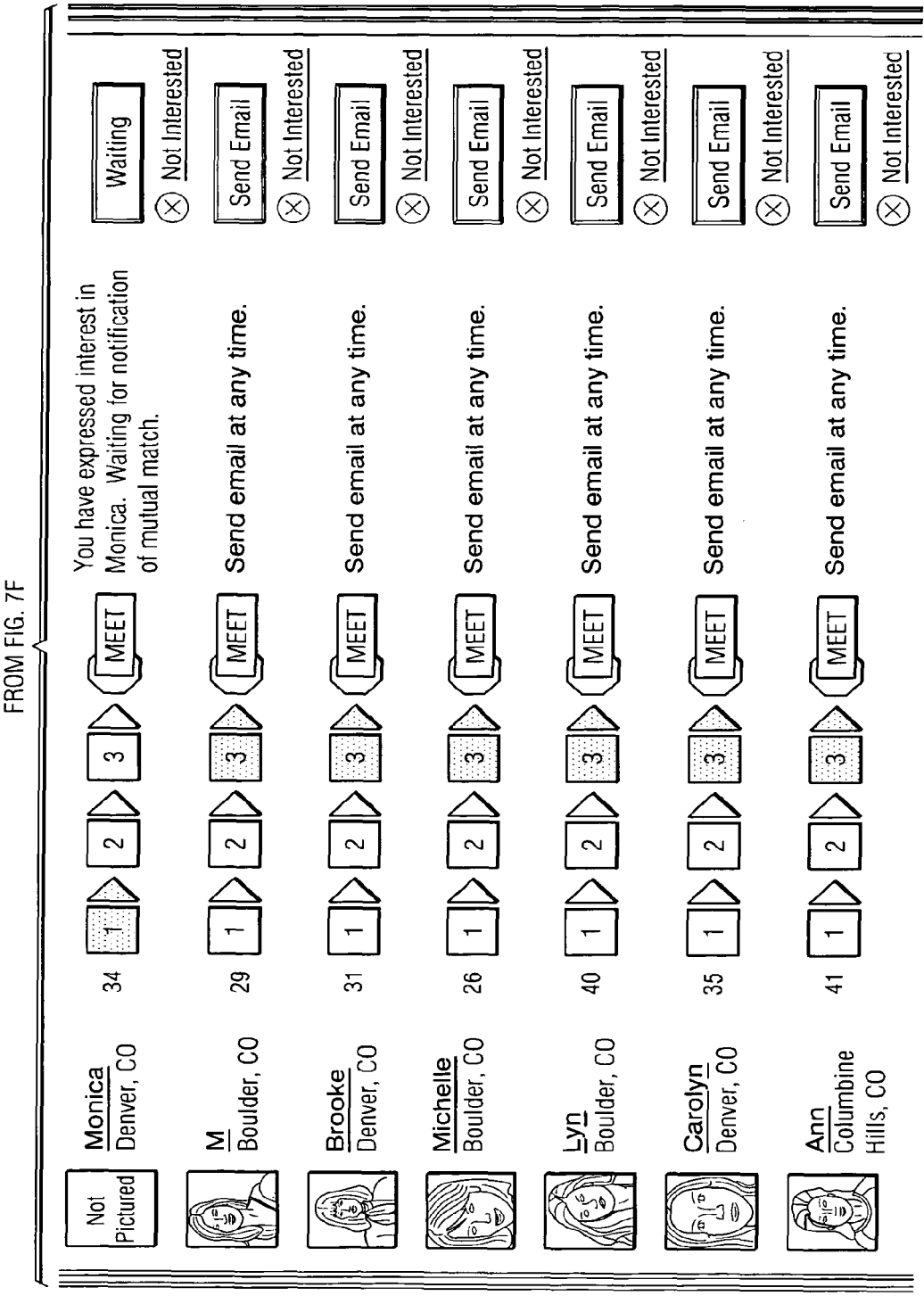

FIG. 9A chemistry

Home | New Matches | Interested in You | Active Matches | Communications

Home  Help  Your Profile  Archives  Sign Out

Email

Profile Summary | Full Profile | How We Match | More Photos

< prev  View All Profiles  next >

Full Profile

Pam
33 yr old Woman
Denver, Colorado

NEXT STEP
Respond to the Relationship Essentials selected by Pam.  [Continue]
⊗ Not Interested More Photos Height: 5'4" (162.6 cms)
Eyes: Brown
Build: Athletic/toned
Hair Color: Dark Brown

Profile Summary

I can't think of a better state than Colorado. All the sunshine, and I just love the mountains. There's some sort of spirituality in them. They don't move, but I always find myself looking at them. I try to spend my weekends doing something outside and taking advantage of this great place. Other than that, I enjoy casual type of environments, but I also enjoy the theater, ballet, and other arts. I'm a pretty down to earth person, and I'd say what you see is what you get; it's hard for me to be fake. The things I look for in any relationship are trust, honesty and respect, and above all, I think the people you surround yourself with should make you feel like a better person for being with them. That said, I don't care for arrogant people, and I would consider myself a considerate, thoughtful person. And hopefully, being together we'll have that connection!

Interests

Interests I'd like to share with my future partner: Camping, Dining out, Movies, Playing sports, Travel, Fitness

Lifestyle

Smoke: Not at all
Drink: Every once in a while
Profession: Financial services
Annual income: $50,001 to $100,000
Current living situation: Live alone
Have children: No
Want children in the future: Yes

TO FIG. 9B

FROM FIG. 9A

Background/Values

Ethnic background: White/Caucasian
Religious affiliation: Jewish
Education: Graduate or professional degree
Languages: English
Political outlook: Liberal

About Your Match

Preferred height range: 5'7" (170.2 cms) to 6'3" (190.5 cms)
Preferred body types: About average, Athletic/toned
Preferred language: English
Preferred ethnic background: White/Caucasian
Preferred religious affiliation: Agnostic, Atheist, Buddhist / Taoist, Christian / Catholic, Christian / Protestant, Christian / Other, Hindu, Jewish, Christian / LDS, Muslim / Islam, Spiritual but not religious, Other, Not Religious
Preferred level of education: Bachelors degree, Graduate or professional degree, PhD / Post Doctoral
Preferred smoking frequency: Not at all
Preferred drinking frequency: Every once in a while, A few times a week

NEXT STEP

Respond to the Relationship Essentials selected by Pam.  [Continue]   ⊗ Not Interested

*FIG. 9B*

FIG. 10 chemistry

| Home | New Matches | Interested in You | Active Matches |
| Home | Help | Your Profile | Archives | Sign Out |

Profile Summary  Full Profile  How We Match  More Photos  Communications  ≤ prev  View All Profiles  next>

Email

How We Match

Assessing long-term compatibility is a complex task, but it starts with certain shared attitudes, values and background.

Take a look at how you and Pam match in the following areas:

|  | Pam matches what you want | You match what Pam wants |
|---|---|---|
| Ethnic background: | ● | ● |
| Religious affiliation: | ● | ● |
| Relationship history: |  |  |
| Profession: | ● | ● |
| Languages: |  |  |
| Have children: |  |  |
| Want children in future: |  |  |
| Height: |  |  |
| Body type: | ● | ● |
| Drink: | ● | ● |
| Smoke: | ● | ● |

Relationship Essentials Pam selected:

- Has strong religious beliefs. — Not Important — You / bbyp — Important
- Is high energy level. — Not Important — You / bbyp — Important
- Feels very comfortable showing affection in public — Not Important — You / bbyp — Important
- Always resolves arguments. — Not Important — You / bbyp — Important Relationship Essentials you selected:

- Is very well educated. — Not Important — bbyp / You — Important

FIG. 14 chemistry

| Home | Home Help Your Profile Archives Sign Out |

New Matches | Interested in You | Active Matches | Email |

Profile Full Profile How We Match More Photos Communications
Interest Meter Relationship Essentials Short Answers Email Meeting < prev View All Profiles next >

Short Answers

Pam
33 yr old Woman
Aurora, Colorado

More Photos

NEXT STEP

Select and send your Short Answers to Pam now.

[Adjust] [Continue]
(X) Not Interested

Select and send your Short Answers to Pam now. Click Continue to send this selection, or Adjust to make changes.

Short Answers

These are the Short Answer topics you selected previously.

Q1: What is the most important lesson you've learned from previous relationships?
Q2: Tell me more about yourself...

NEXT STEP

Select and send your Short Answers to Pam now.

[Adjust] [Continue]
(X) Not Interested

FIG. 15A chemIStry

| Home | New Matches | Interested in You | Active Matches | Communications |

Home  Help  Your Profile  Archives  Sign Out

Email

≤ prev   View All Profiles   next>

Profile Summary  Full Profile  Relationship Essentials  How We Match  More Photos  Short Answers  Email  Meeting Short Answers Pam
33 yr old Woman
Aurora, Colorado More Photos

NEXT STEP

Select and send your Short Answers to Pam now.

ⓧ   Continue
    Not Interested

Short Answers
Select two Short Answer topics for Pam. Write your own, or choose from the list below.

Option 1 - Write your own Short Answer topics.

☑  Tell me more about yourself...

FROM FIG. 15A

Option 2 - Select from the pre-written Short Answer topics below.

☐ How often do you like to go out during the week? What kinds of things do you like to do -- restaurants, movies, bars, or other types of get-togethers? Do you go out in a large group or with just one or two friends?

☐ What role does religion or spirituality play in your life?

☑ What is the most important lesson you've learned from previous relationships?

☐ At what point in a relationship are you comfortable with physical intimacy?

☐ How do you feel about traditional gender roles? For example, do you expect women to stay home, cook and clean house? Do you expect men to earn the sole family income, take care of household repairs and mow the lawn?

☐ What has been your proudest moment?

☐ What are your favorite guilty pleasures?

☐ Tell me about the people -- teachers, friends, family -- who have influenced you the most.

☐ What in your life are you most grateful for?

☐ Do you get along with your parents? How has your relationship changed as you've gotten older?

☐ It's been said that our greatest strength can also be our greatest weakness. Is this true for you?

TO FIG. 15C

FROM FIG. 15B

- ☐ Looking back at your life, what has been the most significant "fork in the road"? Do you feel you made the right choice at the time? Would you choose differently now?
- ☐ If you had the opportunity to speak with a family member who is no longer living, what would you ask them? What would you want them to know about you?
- ☐ What was the best vacation you ever took? What was the worst?
- ☐ Which would you rather have and why: genius-level intellect, world-class talent or stunning good looks?
- ☐ If you could re-live your high school years, knowing what you know now, what would you do differently and why?
- ☐ You have been exiled to live on a deserted island for one year, with no possibility of escape or rescue. Assuming that your basic survival (food, water, shelter) is taken care of, what five items would you bring with you from home?
- ☐ You are making a feature film about your life. What songs do you select for the soundtrack? You'll want at least one song for each major stage of your life, the highs and lows, significant relationships, educational and career milestones, etc.
- ☐ If you could time-transport any historical figure to present-day, who would it be and why?
- ☐ If you could inhibit the body of any currently living famous person for one week, who would you choose and why?

NEXT STEP

Select and send your Short Answers to Pam now.   [Continue]   ⊗ Not Interested

FIG. 18B  FROM FIG. 18A

What are your favorite date activities?
- ☑ Meet for coffee
- ☑ Go to a movie
- ☑ Go for a walk
- ☐ Meet for a drink
- ☐ Attend a sporting event
- ☑ Attend a party or event
- ☐ Meet for dinner What is your preferred attire?
- ☑ Jeans and T-Shirts
- ☑ Dressy Casual
- ☐ Shorts and Sandals
- ☑ Activewear
- ☐ Cocktail Attire
- ☐ Business Attire
- ☐ Business Casual What do you expect from your date?
- ☑ Splitting the check
- ☑ Being dressed appropriately
- ☐ Being open and friendly
- ☑ Showing good manners
- ☐ Having a good conversation
- ☑ Maintaining eye contact
- ☐ Arriving on time
- ☐ Knowing when the date is over ☐ Pre-Date Terms and Conditions

[Save and Continue]

FIG. 19

chemistry    Home  Help  Your Profile  Archives  Sign Out

| Home | New Matches | Interested in You | Active Matches | Email |

Pre-Date Invitation Sent

Thanks for completing your Pre-Date Profile.

Your invitation has been sent to Lark. We will let you know when Lark responds.

[Return to Active Matches]

FIG. 22 chemistry

| Home | New Matches | Interested in You | Active Matches | Email | Your Profile | Archives | Sign Out |

Home  Help  Your Profile  Archives  Sign Out

Limited Search

Basic Search Criteria

Height Preference [5'6" - 5'10"]
Weight Preference [125 lbs - 145 lbs]
Hair Color Preference [Black]
Demographic [African American]
Location [Denver, CO]
Children [No]
Marital Status [Never Been Married]
Has how many photos in profile [At least 2]

Income [Greater Than $25K]
  Greater Than $50K
  Greater Than $75K
  Greater Than $100K
  Greater Than $250K Activity Level [High]
Leisure Activity [Cooking]
Educational Background [Bachelor's degree]
Religious Affiliation [Buddhist]

Advanced Search Criteria

Political Outlook [Liberal]
Parents are still married [Yes]
Values hard work [Somewhat]

Emphasis on money [Slight]
Wants a big family [Definitely]

FIG. 23A

Sign In | Tour | How It Works

Introducing chemistry

The shortest distance between the computer and the cafe.

At Chemistry.com, we've got a different approach to finding a meaningful relationship. Here, you'll find more of the right people...and you'll get to meet them, faster, in the real world. Most important, they're looking for a future, not a fling.

An enduring relationship that starts with the spark of chemistry.

Get started now ▷

I could tell from our communications online that we would get along, but as soon as we met I could feel the zing.

FIG. 23B chemistry

| Home | | | | | | Home  Help  Sign In |
|---|---|---|---|---|---|---|
| My Home | New Matches | My Profile | Interested in You | My Account | My Archives | Active Matches | My Personality Profile | Email |

Welcome to the Personality Profile

Fill in the basic information requested here, and then begin the Personality Profile where you'll find a series of fun, engaging and sometimes surprising questions.

Already a member? Sign In

First Name [_____] Why do we ask for your first name?

Username [_____]

Password [_____]

Confirm Password [_____]

Email Address [_____]

I am a [Choose ▼]

Looking for a [Choose ▼]

Your Birth Date [Month ▼] [Day ▼] [Year ▼]

Country [United States ▼]

Zip/Postal Code [_____]

FIG. 23C chemistry

| Home | Home Help My Profile Archives Sign Out |
| New Matches | |
| My Home My Profile My Account My Archives Interested in You Active Matches My Personality Profile Email |

Core Characteristics

In your family, which one are you?
○ Oldest child
○ Middle child
○ Youngest child
○ Only child When do you worry most about a major purchase?
○ It depends
○ Before making the purchase
○ While making the purchase
○ After making the purchase Describe yourself. To what degree are you:

FIG. 23D chemistry

| Home | New Matches | Interested in You | | Home | Help | My Profile | Archives | Sign Out |

My Home  My Profile  My Account  My Archives  Active Matches  My Personality Profile Email

Universal Traits

| To what degree are you: | A little | Quite a bit | Very much | Completely |
|---|---|---|---|---|
| Talkative | O | O | O | O |
| Enthusiastic | O | O | O | O |
| Outgoing | O | O | O | O |
| Helpful | O | O | O | O |
| Forgiving | O | O | O | O |
| Kind | O | O | O | O |
| Organized | O | O | O | O |
| Thorough in completing tasks | O | O | O | O |
| An efficient worker | O | O | O | O |
| Creative | O | O | O | O |
| A thinker | O | O | O | O |
| Interested in new experiences | O | O | O | O |
| Calm and relaxed | O | O | O | O |

FIG. 23E chemistry

Home | New Matches | Interested in You | Active Matches | Home Help My Profile Archives Sign Out
My Home My Profile My Account My Archives | Email
My Personality Profile Non-Verbal Communcation: 1

What is the relationship between these two people?

○ They are co-workers discussing a business issue.
○ They are siblings planning a family event.
○ They are old college friends catching up.
○ They are new acquaintances getting to know each other.
○ They are a long married couple on vacation.

[ Save and Continue ▷ ]

FIG. 23I chemistry

| Home | New Matches | Interested in You | My Account | My Archives | Active Matches | Email | Home  Help  My Profile  Archives  Sign Out |

My Home  My Profile  My Account  My Archives  My Personality Profile

Physical Fitness

Is exercise an important part of your daily routine, or something that you get around to every once in a while?

Step One: Use the About You slider to indicate how important physical fitness is in your life.

Step Two: Use the About Your Match slider to indicate the level of fitness you seek in your ideal partner.

Very Fit

About You

Not Fit

Very Fit

About Your Match

Not Fit

Save and Continue

FIG. 23K chemistry

| Home | New Matches | Interested in You | Full Profile | How We Match | Active Matches | Communications |

Home  Help  My Profile  Archives  Sign Out

Email

How We Match

Assessing long-term compatibility is a complex task, but it starts with certain shared attitudes, values and background.

About You

YOUR MAJOR PERSONALITY TYPE: DIRECTOR
your minor personality type: explorer

About Liz

HER MAJOR PERSONALITY TYPE: EXPLORER
her minor personality type: negotiator

Characteristics of all four personality types can be found within each of us, but there is almost always one personality type that is dominant. We call this the major personality type. The chemistry assessment tool also identifies your minor, or secondary, personality type. You exhibit some aspects of your minor personality type, though not all of them, or to the same degree as with your major personality type.

FIG. 23L chemistry

| Home | New Matches | Interested in You | Home | Help | My Profile | Archives | Sign Out |

Active Matches | Email

You are a DIRECTOR/explorer

You are courageous; and you seek challenges. You are a tough-minded, independent and daring thinker who likes to explore ideas or problems thoroughly. You focus easily. And you are persistent, systematic and competent in pursuing your interests and goals.

You are also assertive; and you enjoy the opportunities your hard work wins.

You have a lot of energy. You think quickly, make decisions more easily than most, dislike unnecessary rules, and take a rational approach to people, issues and ideas.

You don't often enjoy "small talk." You are generally not interested in pleasing boring people and you gravitate to men and women who are intellectually exciting and get to their point quickly during conversations.

You are not conventional in most of your attitudes and values. You tend to be irreverant and pragmatic and you like spontaneous people. You can be an exciting, yet hard driving and exacting, friend and companion.

Liz is an EXPLORER/negotiator

Liz is a highly spontaneous person who likes to try new things. Novel and unpredictable situations don't bother her; instead Liz finds them challenging and exciting Liz tends to be focused and resourceful and is able to juggle a lot of projects at the same time; as a result Liz is sometimes a whirlwind of activity.

Liz has a firm grip on reality and enjoys living in the present tense. But Liz has a keen imagination that enables her to lift off from time and space and be remarkably creative.

Liz is humorous and likes entertaining others.

Liz has a deep sense of compassion and is able to show genuine insight into the needs of others; is good at listening and talking; and expresses a genuine desire to be helpful.

Yet Liz is easy-going. Her tolerance for others and their beliefs; her lack of prejudice; her ability to compromise and her occasional antics make Liz popular with others and a great companion.

FIG. 23M

Your Personality Traits: How You Complement Liz

The five personality traits featured below are generally accepted as the "Big Five", or traits that are common to all of us to some degree.

Take a look at how you and Liz compare in your responses.

Extravert
Friendly, talkative and outgoing. Often takes on leadership roles. Comfortable around others, especially large groups.

Agreeable
Easygoing in nature. Can be tolerant and accommodating of others. Interested in creating harmony and building consensus.

Conscientious
Determined to meet or exceed stated goals. Disciplined and extremely focused at work. Not easily distracted.

Open to New Experiences
Interested in innovation, experimentation and new solutions. Willing to try new experiences. Creative, original thinker.

Emotional Stability
Strong and steady, not easily upset. Level-headed in response to unforeseen changes or problems. Calm and collected.

FIG. 230 chemistry

Home  Help  My Profile  Archives  Sign Out

Select Your Relationship Essentials.

Select FIVE characteristics that are IMPORTANT for you to find in a long-term partner, and then use the slider at the right to indicate precisely how IMPORTANT each item is.

| Important | Statement | Importance Level |
|---|---|---|
| ☒ | Shares feelings and emotions on a daily basis. | Not Important — Important |
| ☒ | Finds humor to be a key ingredient for life. | Not Important — Important |
| ☒ | Depends heavily on their partner. | Not Important — Important |
| ☒ | Is highly creative. | Not Important — Important |
| ☒ | Is very very well educated. | Not Important — Important |

FIG. 23P chemistry

Home  Help  My Profile  Archives  Sign Out

☐ Always resolves arguments.    Not Important ▭▭▭▭ Important

☐ Is very physically attractive.   Not Important ▭▭▭▭ Important

☐ Is extremely clean and neat.   Not Important ▭▭▭▭ Important

FIG. 23Q chemistry

Home  Help  My Profile  Archives  Sign Out

Select Your Relationship Essentials.

Select FIVE characteristics that are NOT IMPORTANT for you to find in a long-term partner, and then use the slider at the right to indicate precisely how NOT IMPORTANT each item is.

| Not Important | Statement | Importance Level |
|---|---|---|
| X | Shares feelings and emotions on a daily basis. | Not Important ▭ Important |
| X | Finds humor to be a key ingredient for life. | Not Important ▭ Important |
| X | Depends heavily of their partner. | Not Important ▭ Important |
| X | Is highly creative. | Not Important ▭ Important |
| X | Is very very well educated. | Not Important ▭ Important |

FIG. 23R

*FIG. 24A* chemistry   Home   Help   Your Profile   Archives   Sign Out

| Home | New Matches | Interested in You | Active Matches | Email |

Pre-Date Profile   So, you're interested in meeting Anna in person? Great. The Pre-Date is an informal, low-pressure next step in the process of getting to know your match. The Chemistry scheduling tool makes it easy to find a convenient time and place to meet.

Before we send your Pre-Date request to Anna, please take a moment to complete the sections below.

Setting Up Your Pre-Date

The Pre-Date Preferences you submitted previously have been saved. Would you like to continue using the same preferences, or adjust them for your Pre-Date with Anna?

Include a personal message to Anna that will be sent with your Pre-Date request. (Optional)

[                                                                                    ]

Tell us about your availability for Pre-Dates and your general dating preferences. This information will be used to find a mutually convenient time and place for you to meet.

What are the best days and times for you to go on a Pre-Date?

| | | AM Hours | | | | PM Hours | | | | | | |
|---|---|---|---|---|---|---|---|---|---|---|---|---|
| | Any | 8-9 | 9-10 | 10-11 | 11-12 | 12-1 | 1-2 | 2-3 | 3-4 | 4-5 | 5-6 | 6-7 | 7-8 |
| Mon. | ☐ | ☐ | ☐ | ☐ | ☐ | ☐ | ☐ | ☐ | ☐ | ☐ | ☐ | ☐ | ☐ |
| Tue. | ☐ | ☐ | ☐ | ☐ | ☐ | ☐ | ☐ | ☐ | ☐ | ☐ | ☐ | ☐ | ☐ |
| Wed. | ☐ | ☐ | ☐ | ☐ | ☐ | ☐ | ☐ | ☐ | ☐ | ☐ | ☐ | ☐ | ☐ |
| Thu. | ☐ | ☐ | ☐ | ☐ | ☐ | ☐ | ☐ | ☐ | ☐ | ☐ | ☐ | ☐ | ☐ |
| Fri. | ☐ | ☐ | ☐ | ☐ | ☐ | ☐ | ☐ | ☐ | ☐ | ☐ | ☐ | ☐ | ☐ |
| Sat. | ☐ | ☐ | ☐ | ☐ | ☐ | ☐ | ☐ | ☐ | ☐ | ☐ | ☐ | ☐ | ☐ |
| Sun. | ☐ | ☐ | ☐ | ☐ | ☐ | ☐ | ☐ | ☐ | ☐ | ☐ | ☐ | ☐ | ☐ |

What kinds of food do you like to eat on a date?

- ☐ American
- ☐ Italian
- ☐ French
- ☐ Chinese
- ☐ Casual
- ☐ Middle Eastern
- ☐ Dessert and Coffee
- ☐ Any

- ☐ Fast Food
- ☐ Mexican
- ☐ Japanese/Sushi
- ☐ Indian
- ☐ Thai
- ☐ Vietnamese
- ☐ Seafood

- ☐ BBQ
- ☐ Tapas
- ☐ Cajun
- ☐ Greek
- ☐ Southern/Soul
- ☐ Vegetarian
- ☐ Steakhouse

- ☐ Hamburgers
- ☐ Pub Fare
- ☐ Fine Dining
- ☐ Lebanese
- ☐ Kosher
- ☐ Southwestern
- ☐ Dim Sum

What are your favorite date activities?

- ☐ Meet for coffee
- ☐ Meet for dinner
- ☐ Go to a movie
- ☐ Attend a sporting event
- ☐ Go for a walk
- ☐ Attend a party or event

FIG. 24B

| chemistry | Home  Help  Your Profile  Archives  Sign Out |

| Home | New Matches | Interested in You | Active Matches | Email |

☐ Meet for a drink   ☐ Any

What is your preferred date attire?

☐ Jeans and T-Shirts   ☐ Dressy Casual   ☐ Shorts and Sandals
☐ Activewear          ☐ Cocktail Attire  ☐ Business Attire
☐ Business Casual     ☐ Any

What do you expect from your date?

☐ Splitting the check            ☐ Being dressed appropriately
☐ Being open and friendly        ☐ Showing good manners
☐ Having a good conversation     ☐ Maintaining eye contact
☐ Arriving on time               ☐ Knowing when the date is over
☐ Any

[ Send Pre-Date Request ▷ ]

FIG. 24C

| chemistry | Home  Help  Your Profile  Archives  Sign Out |

| Home | New Matches | Interested in You | Active Matches | Email |

Pre-Date Preferences  So, you're interested in meeting Anna in person? Great. The Pre-Date is an informal, low-pressure next step in the process of getting to know your match. The Chemistry scheduling tool makes it easy to find a convenient time and place to meet.

Setting Up Your Pre-Date

The Pre-Date Preferences you submitted previously have been saved. Would you like to continue using the same preferences, or adjust them for your Pre-Date with Anna?

Include a personal message to Anna that will be sent with your Pre-Date request. (Optional)

[                                                      ]

Adjust Your Pre-Date Preferences    [ Send Pre-Date Request ▷ ]

FIG. 24D chemistry

Home | Help | Your Profile | Archives | Sign Out

New Matches | Interested in You | Active Matches | Email

Home

Pre-Date Invitation  Find a meeting time and location that work for both you and Anna.

Mutually Convenient Time and Place

To agree to the Pre-Date time and location selected by our system based on information in your Pre-Date Preferences, click on I Accept.

Location    Starbucks Coffee
            815 East 17th Ave
            Longmont, Colorado
            United States Date & Time  Saturday, Sept. 03, 2005
             11:00 AM

[ Yes, this works for me. I accept ▷ ]

OR

Alternative Time and/or Location

To propose another time and/or place for your Pre-Date, click on Suggest Alternative.

[ No, let's try another time and/or place ▷ ]

*FIG. 24E* chemistry     Home   Help   My Profile   Archives   Sign Out

| Home | New Matches | Interested in You | Active Matches | Email |

Pre-Date Invitation You are welcome to suggest an alternative location and/or time for your Pre-Date. We will send your suggestion to Anna and let you know if it works for her.

Alternative Time and Place

Use the area below to enter information about your suggested Pre-Date location and time. For clarity, please enter a valid street address for your location. To find a date when Anna is available, click on the calendar icon. **Fields marked with * are required.**

My message to Anna:

Let's Meet At*

Area/Neighborhood

Address*

City*    State*
[Select ▼]

Date*    [📅] Select a date

Time*
[Select ▼]

◁ Back to Original    Send Suggested ▷

SYSTEM AND METHOD FOR PROVIDING A SEARCH FEATURE IN A NETWORK ENVIRONMENT

RELATED APPLICATION

This application is a continuation (and claims the benefit of priority under 35 U.S.C. §120) of U.S. application Ser. No. 11/237,490, filed Sep. 27, 2005, now U.S. Pat. No. 7,613,706 entitled "SYSTEM AND METHOD FOR PROVIDING A SEARCH FEATURE IN A NETWORK ENVIRONMENT". The disclosure of the prior application is considered part of (and is incorporated by reference in) the disclosure of this application.

TECHNICAL FIELD OF THE INVENTION

This invention relates in general to the field of communications and, more particularly, to a system and a method for providing a search feature in a network environment.

BACKGROUND OF THE INVENTION

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections.

Certain network protocols may be used in order to allow an end user to conduct an on-line search of candidates to fill a given vacancy. These protocols may relate to job searches, person finding services, real estate searches, or on-line dating. While some naive business people believe that on-line dating is simply a matter of matching supply and demand, there is statistical and empirical evidence to suggest that successful on-line dating entails far more.

For example, people having similar and/or compatible character traits and values should be matched together. However, effectively linking two participants together can prove to be a challenging endeavor. Coordinating a relationship between two like-minded individuals can be a significant chore, as there are a number of obstacles and barriers that must be overcome.

It would also be beneficial to counsel certain users about a dating deficiency that they may have. In addition, it may be useful to compile, process, and maximize all feedback information that is given by an end user such that this information can be evaluated and then leveraged in order to deliver an optimal candidate selection or match pool to the end user.

In still other scenarios, participants in an on-line dating scenario may need guidance on making arrangements for a first date. Suggestions and recommendations are welcomed by participants who are unsure of which dating location would be appropriate for both participants. Most end users would also appreciate being afforded the opportunity to exit the dating experience at any time. Still other end users would enjoy reading candid responses from a prospective mate, while simultaneously having some control over the questions being asked.

These operations (and many others) need to be accounted for by a system operator in order to achieve a suitable level of satisfaction from their customers. Systems that fail to account for these issues can mislead their customers, frustrate their clients, and waste the time of all those involved. Note that any features provided by a given dating platform should be easily understood and readily used by the consumer. The end user should not be burdened with complex or cryptic technology that he has to decipher before utilizing. Accordingly, the ability to provide effective mechanisms and features for optimally matching in an on-line community offers a significant challenge to web site operators, component manufacturers, and system designers.

SUMMARY OF THE INVENTION

From the foregoing, it may be appreciated by those skilled in the art that a need has arisen for an improved communications platform that provides for more beneficial features in offering networking services and capabilities to an end user. In accordance with one embodiment of the present invention, a system and a method for providing an on-line dating platform in a network environment are provided that greatly reduce disadvantages and problems associated with conventional on-line dating management techniques.

According to one embodiment of the present invention, a method for providing a feature in a network environment is provided that includes a central web site operable to interface with one or more end users and to manage information related to one or more of the end users. The web site includes an interest rating component that allows one or more of the end users to indicate a level of interest in one or more of the other end users.

In more particular embodiments, the interest rating component is provided as a graphical illustration that reflects a slider bar to be used by one or more of the end users in order to make selections or designations about potential dating candidates. In still more particular embodiments, if the slider bar is moved in one direction, indicating a strong preference for a particular candidate, then the particular candidate is moved to an active state where a relationship between two of the end users progresses. If the slider bar is moved to in another direction, indicating a low level of interest for a particular candidate, then the particular candidate is moved to an inactive state where a relationship between two of the end users does not continue. A designation of the slider bar by one of the end users represents a quantitative value to be processed by the central web site. The central web site can use the interest rating component to match two of the end users that have substantially similar interest ratings.

Certain embodiments of the present invention may provide a number of technical advantages. For example, according to one embodiment of the present invention, a service approach is provided that allows a given end user to utilize a level of interest rating component. An interest level slider bar can be used by the end user in order to make selections or designations about potential dating candidates. The slider bar is easy to use and can solicit the end user's thoughts about a prospective mate. The level of interest bar is conducive to an expedient disposal of individuals that offer minimal intrigue for the end user. In a similar fashion, the level of interest bar can be readily utilized in order to initiate the next step in the dating process.

Another advantage of the present invention is that the end user is provided with a number of comparison features. For example, in some embodiments, a personality profile can be displayed to the end user concurrently with the personality profile of a potential candidate. Using such a comparison/contrast format, the end user could readily see how his interests and character traits are aligned or asymmetrical: either of which may produce positive or negative outcomes. Other comparisons (or overlay formats) can be provided by the question/answer sections of the dating platform. Note that many of the questions being answered by a given participant may be pre-selected by the interested participant (or chosen by their own accord). This offers a higher degree of control for the end user and also focuses on issues that are truly important to each individual. Many of these features are discussed in greater detail below with reference to corresponding FIG-URES.

Yet another advantage of the present invention relates to a post-date follow up features. The responses from the post-date follow up are an invaluable tool for the operator of the website. The responses reflect important character traits that can be fed back into the system for future matches. Additionally, the operator can offer constructive feedback to an end user who appears to be struggling in some area of dating. In one implementation, a cumulative average (e.g. after three or more dates) could be taken of several post-date questions, whereby a single area can be pinpointed for improvement. This is verifiable, informative, and truthful dating information for the end user to consider.

Note that there is a plethora of additional advantages that are provided by the tendered architecture. Some of these advantages are evident after reviewing the FIGURES and accompanying discussions. Certain embodiments of the present invention may enjoy some, all, or none of these outlined advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 2A-H are simplified screen shots of an example protocol for participating in an on-line dating service;

FIGS. 3A-B are simplified screen shots of an example profile to be used in the on-line dating service;

FIGS. 4A-C are simplified screen shots involving an example personality profile to be used in the on-line dating service;

FIG. 5 is a simplified screen shot of an example home page for an end user of the on-line dating service;

FIG. 6C is an example schematic that shows how the "Interested In You" component can operate in one implementation;

FIGS. 7A-H are simplified screen shots of an example listing of active matches to be used in the on-line dating service;

FIGS. 9A-B are simplified screen shots of an example full profile to be used in the on-line dating service;

FIG. 10 is a simplified screen shot of an example matching protocol to be used in the on-line dating service;

Figure 13A:
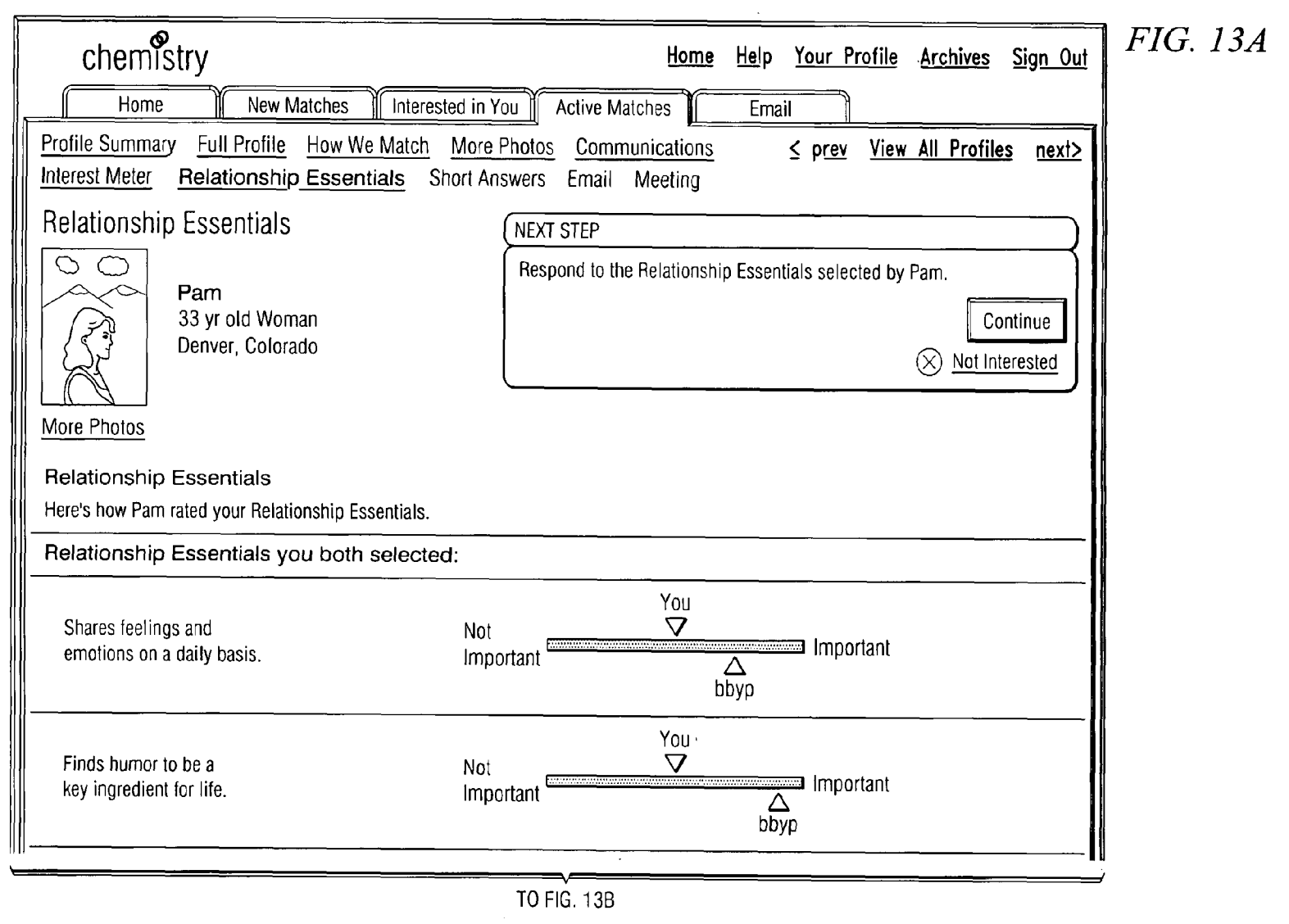
Figure 13B:
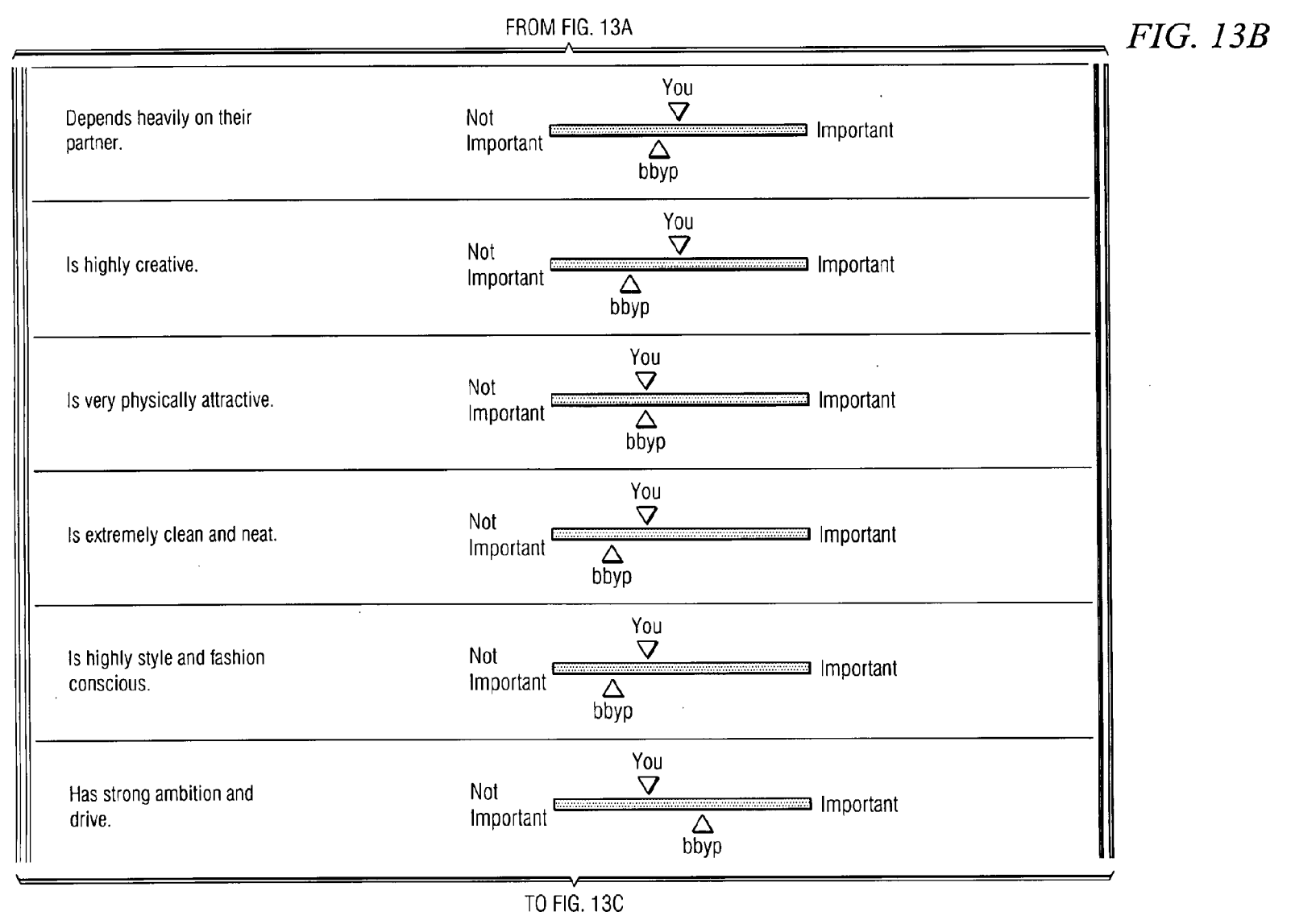

FIGS. 13A-D are simplified screen shots of example relationship essentials to be used in the on-line dating service;

FIG. 14 is a simplified screen shot of an example short answer introduction to be used in the on-line dating service;

FIGS. 15A-C are simplified screen shots of example short answer questions to be used in the on-line dating service;

FIGS. 18A-B are simplified screen shots of an example pre-date profile and scheduling protocol to be used in the on-line dating service;

FIG. 19 is a simplified screen shot of an example pre-date confirmation to be used in the on-line dating service;

FIG. 22 is a simplified screen shot of an example limited search criteria template to be used in the on-line dating service;

FIGS. 24A-G are simplified screen shots of an example pre-date phase to be used in the on-line dating service.

DETAILED DESCRIPTION OF EXAMPLE EMBODIMENTS OF THE INVENTION

Figure 1:
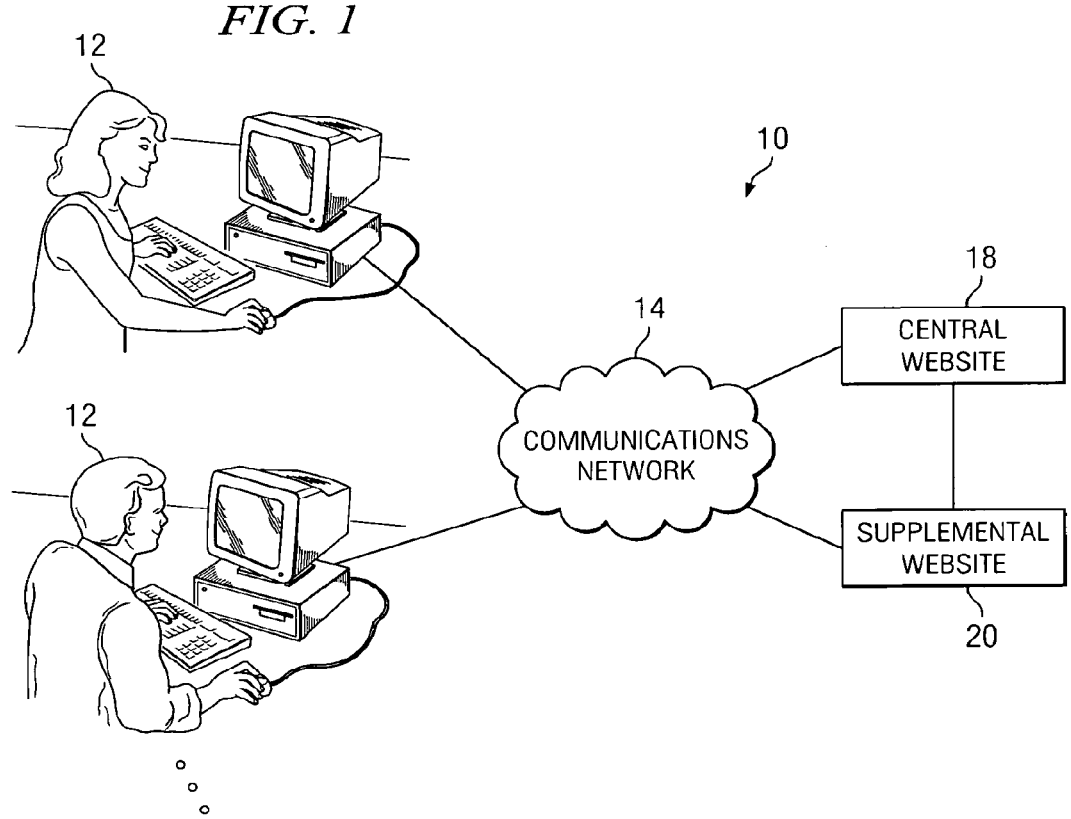
FIG. 1 is a simplified block diagram of a system for providing an on-line dating service in accordance with one embodiment of the present invention.

FIG. 1 is a simplified block diagram of a system 10 for facilitating an on-line dating scenario in a network environment. In other embodiments, system 10 can be leveraged to identify and to evaluate suitable candidates in other areas (e.g. hiring/employment, recruiting, real estate, general person searches, etc.). FIG. 1 includes multiple end users 12, a communications network 14, a central web site 18, and a supplemental web site 20. FIG. 1 may be configured such that inter and intra-communications are readily achieved by any of the components included therein. The present invention is capable of providing both an on-line component (as illustrated by FIG. 1) and an off-line component (as described below) such that one or more end users can meet, gather information, resolve to meet, and then subsequently meet in person with the assistance of system 10. Ancillary components to such a comprehensive process may involve pre-date profiles, post-date follow-ups, and a myriad of other significant features, as outlined in greater detail below.

System 10 can be used to offer a multitude of unique features and capabilities to a group of end users. A brief summary of some of these features is offered immediately below. Additional details relating to each of these tools is discussed more fully with reference to the accompanying FIGURES.

A first feature provided by system 10 relates to a "Level of Interest Rating." An end user is provided with a web prompt (e.g. a slider bar), which solicits the end user's interest level of a potential candidate. The scale can range from "No Interest" to "High Interest" or system 10 can use any other gradation where appropriate. Such an interest-ometer stands in stark contrast to other rudimentary systems in which a simple match is generated based on profile information. Moreover, prior architectures process according to strict compatibility, but fail to accommodate the interest component. Consider the case where a person's profile information would suggest one potential mate, but their interest bar resultants yield an attraction to a completely different type of individual. System 10 effectively accounts for such a discrepancy (and others) in offering a superior method of matching two individuals.

The indicated interest can be sent to system 10 and, further, be used in additional processing for this end user. In such a scenario, feedback from the interest bar can be aggregated, compiled, and processed for the future coordination of potential matches. Hence, a reevaluation protocol is facilitated by continuing to leverage results from the interest bar.

A second feature provided by system 10 relates to multi-tiered questions. Along the dating continuum, several levels of questions are proffered for the end user. During the unique questioning protocol, preferred answers are selected by one candidate and then the other potential candidate receives the questions that include these answers. The questions/stages can be completed in pairs. The results are then displayed in a novel way, whereby selections from one candidate are illustrated along with the other candidate's responses. This scale (or seesaw configuration) readily displays the differences, the range of differences, and/or the congruency in the answers. Note that the "Not Interested" bar is displayed throughout the dating process such that the end user can exit the romantic pursuit at any given time. The discussion of this second feature is amenable to detailed illustrations, which are discussed below.

A third feature provided by system 10 relates to a resolution to a meeting. Lacking in most system is any method for facilitating a meeting after the first three stages of interaction have been finished. System 10 addresses this void by offering a pre-date profile for the participants to complete. Optimal date, time, cuisine, and other preferences can be solicited from both parties. Once a mutually agreeable date has been planned, the parties are invited to meet at the proposed time, place, and location. In a particular embodiment, during the course of the date, a courtesy phone call may be placed to either of the participants (or a specific participant at their request) in order to indicate that the date has ended. Note that a first date may only be for coffee; so once the allotted time has passed, the meeting should conclude. In another embodiment, such a call could be used to provide a graceful exit for a party who is experiencing an uncomfortable situation.

A fourth feature provided by system 10 relates to a post-date evaluation. Once the date is completed, the parties can return to the site and fill out a post-date follow up evaluation. This may be inclusive of questions that relate to appearance, punctuality, chemistry, etc. A sampling of these questions is provided and discussed below with reference to corresponding FIGURES. A second date solicitation could also readily be provided at this point along the dating timeline. Additionally, a dating report card could be provided to each of the end users. This could be done in order to provide benign, constructive feedback to an end user, who may be experiencing difficulty in one particular facet of his dating approach (e.g. the end user may be counseled to focus on being a better listener).

A fifth feature provided by system 10 relates to an "Interested in You" component. The "Interested in You" component is broken into two segments: 1) Match List; and 2) Interested in You. Other on-line dating platforms simply populate matches concurrently. In the architecture of system 10, the interest level is separated from the "want to meet" element. The other candidate only receives an e-mail if the interest level is positive (e.g. greater than 7 [scale 1-10]). Negative interest levels are not communicated to the other potential match. These functionalities can be better understood with reference to accompanying illustrations and the discussions that are provided below.

A sixth feature provided by system 10 relates to a limited search, which can be conducted by a participant. The limited search may be somewhat constricted (e.g. only one limited search per day). The limited search capability would allow an end user to seek out individuals having an exact qualification or a specific characteristic. This would achieve a level of granularity for the end user, who may have precise criteria for choosing a romantic interest to pursue. Additional platform tools, capabilities, and features are provided below and are discussed with reference to accompanying FIGURES. These elements are described immediately following the subsequent description of the components of the architecture of FIG. 1.

End users 12 are clients, customers, prospective customers, or entities wishing to participate in an on-line dating scenario and/or to view information associated with other participants in the system. End users 12 may also seek to access or to initiate a communication with other users that may be delivered via communications network 14. End users 12 may review data (such as profiles for example) associated with other users in order to make matching decisions or elections. Data, as used herein in this document, refers to any type of numeric, voice, video, or script data, or any other suitable information in any appropriate format that may be communicated from one point to another.

In one embodiment, end user 12 represents (and is inclusive of) a personal computer that may be used to access the Internet. Alternatively, end user 12, as illustrated in FIG. 1, may be representative of a cellular telephone, an electronic notebook, a laptop, a personal digital assistant (PDA), or any other suitable device (wireless or otherwise: some of which can perform web browsing), component, or element capable of accessing one or more elements within system 10. An end user interface, which may be provided in conjunction with the items listed above, may further comprise any suitable interface for a human user such as a display, a video camera, a microphone, a keyboard, a mouse, or any other appropriate terminal equipment according to particular configurations and arrangements. In addition, the end user interface may be a unique element designed specifically for communications involving system 10. Such an element may be fabricated or produced specifically for matching applications involving end user 12.

Communications network 14 is a communicative platform operable to exchange data or information emanating from end user 12. Communications network 14 represents an Internet architecture in a particular embodiment of the present invention, which provides end user 12 with the ability to electronically execute or to initiate actions associated with finding a potential candidate. Alternatively, communications network 14 could be a plain old telephone system (POTS), which end user 12 could use to perform the same operations or functions. Such transactions may be assisted by management associated with central web site 18 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Central web site 18 is a server (in one embodiment) that is operable to receive and to communicate information to end user 12. Alternatively, central web site 18 may be any switch, router, gateway, processor, component, object, or element operable to facilitate communications involving end user 12. In one particular embodiment, central web site 18 is engaged in facilitating interaction(s) between parties interested in seeking a romantic partner (i.e. on-line dating). For example, central web site 18 can be on-line dating service provider www.Match.com. In other embodiments, central web site 18 is any web site or architecture interested in facilitating a connection involving two or more people, and which may make use of a given photograph. This could include services associated with job placements, escort services, real estate, recruiting services (e.g. in athletics or in academic settings), etc.

Supplemental web site 20 is a server (in one embodiment) that is operable to receive and to communicate information to end user 12. Alternatively, supplemental web site 20 may be any switch, router, gateway, processor, component, object, or element operable to facilitate communications involving end user 12. In one particular embodiment, supplemental web site 20 is operable to perform processing functions for central website 18. For example, supplemental web site 20 can be used to coordinate scheduling, execute matching algorithms, assist in uploading or downloading large pieces of data, implement billing protocols for end users, etc. Supplemental web site 20 can alleviate any of the processing loads present in the network.

A link may be provided on either central web site 18 or supplemental web site 20 (or on both) such that a given end user can be immediately directed to the other site. While one embodiment offers a connection between these two sites, these two sites may be completely independent of each other in other embodiments, where independent entities operate these sites. In the case that these two sites are operable to communicate with each other, a secure connection can be provided in order to maintain the integrity of the information propagating between the sites and to protect the privacy of the individuals implicated by the communications.

With regard to the specific items that effectuate the teachings of the present invention, central web site 18 and/or supplemental web site 20 may include software and/or algorithms to achieve the operations for processing, communicating, delivering, gathering, uploading, maintaining, and/or generally managing data, as described herein. This includes suitably displaying some or all of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. Considerable flexibility is provided by the structure of central web site 18 and supplemental web site 20 in the context of system 10. Thus, it can be easily appreciated that such functions could be provided external to central web site 18 and supplemental web site 20. In such cases, such a functionality could be readily embodied in a separate component, server, processor, device, or module. Note that these on-line dating features and capabilities may be provided in just one of these elements, in both, or distributed across both of them. Hence, in certain embodiments, the on-line dating operations may be consolidated in a single web site, where no redirection is needed, nor performed for the user.

In operation of an example flow, consider a case where a given end user is interested in participating in an on-line dating scenario. End user 12 can access the Internet, travel to central web site 18, register, and create a profile on the site. Note that end user 12 may access supplemental web site 20 directly as well. Moreover, end user 12 can access either web site through any suitable banner, pop-up, partnership, e-mail solicitations, direct mailings, etc. It can be appreciated that on-line commerce can be generated by a plethora of marketing tools and any such tools can readily cooperate with the operations of the present invention.

From this point, matching (of any form) can commence amongst the members of the on-line community. For example, in the context of a romantic endeavor, a person may begin the dating process or engage in communications that would spawn such dating. Other applications could include job applicants who are being sought by employers. Any of the individuals who reside in the on-line community can begin using any of the tools or capabilities of the platform.

FIGS. 2A-H illustrate example screen shots that may be provided in the on-line dating process and which may be used for purposes of discussion. It is imperative to note that these illustrations are only being provided to further outline a particular implementation of the present invention. In no way should these diagrams be used to limit or to restrict the broad teachings of the present invention. Such illustrative information has been offered earnestly and, thus, should not be construed to confine the broad applications of the present invention.

Figure 2A:
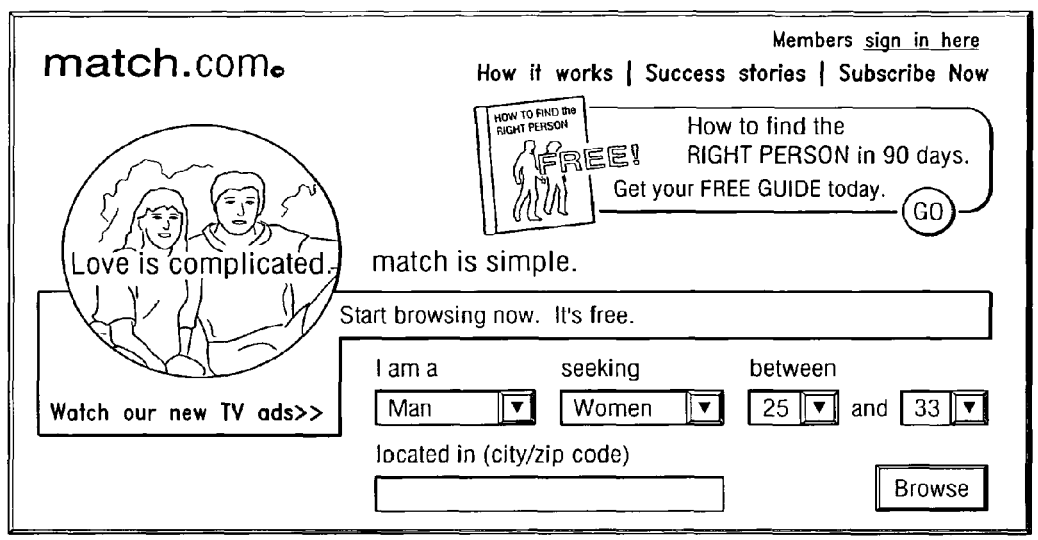
Figure 2B:
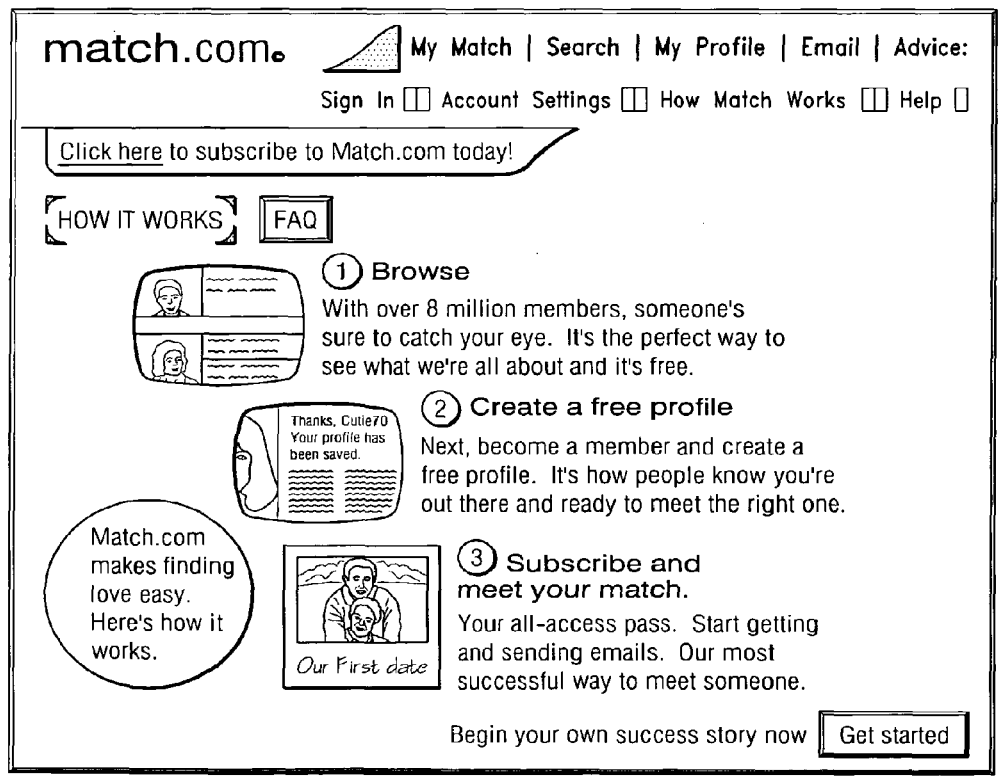
Figure 2C:
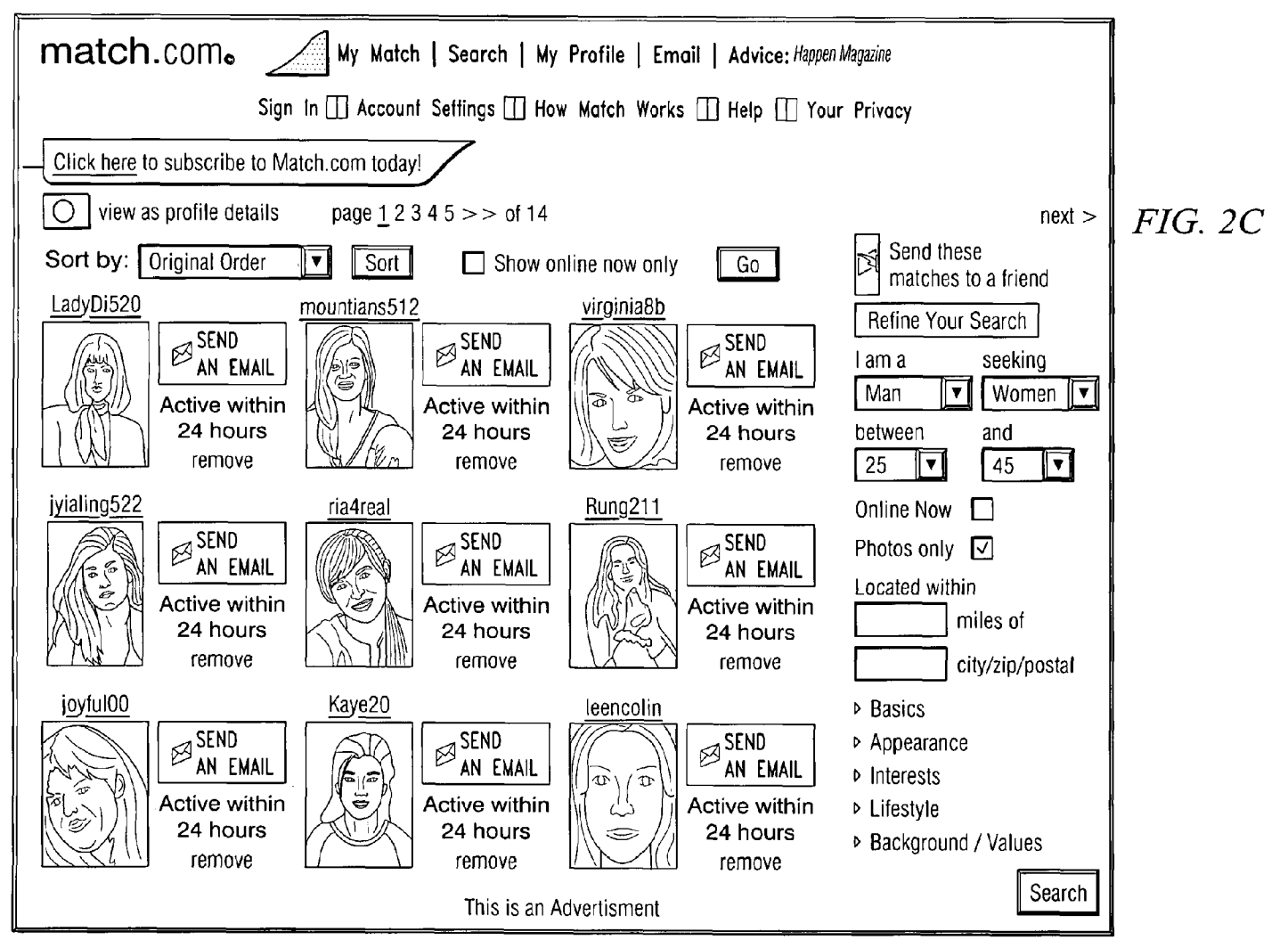
Figure 2D:

FIG. 2A is an example screen shot of a home page in which an interested end user may begin his/her journey. In this example, the home page offers zip code information, as well as a preliminary election of an age and a gender preference. After clicking on the "How it Works" icon on the home page, the end user is directed to the screen shot of FIG. 2B. FIG. 2B is an example screen shot that outlines (generically) the on-line dating process. At a first step, an end user browses the web site. Now interested in participating, the end user then creates a profile. The third step in the process involves subscribing to the service and then receiving information from others who are part of the on-line community.

FIG. 2C is an example screen shot of a number of profiles. In the context of this shot, an end user may be simply browsing. Once an end user has clicked on a given person in this screen, he is directed to FIG. 2D, where he is solicited to sign up for the on-line dating subscription such that he can effectively contact his candidate selection. FIGS. 2E-H are example screen shots of a profile of a given end user. In this instance, her criteria are displayed, as well as other information that may be pertinent to a potential mate. Any suitable items can be provided in such a profile (such as interests, favorite hot spots, favorite things, desire for children, background, etc.). Virtually any information (inclusive of video and audio data) may be provided in such a profile.

Figure 3A:
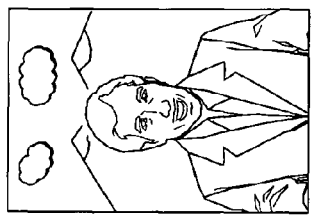

FIGS. 3A-B are simplified screen shots of an example profile to be used in the on-line dating platform. The profile includes information that was solicited from this end user ("Todd") when he set up his on-line dating account. The profile includes general information (e.g. address, height, weight, etc.), as well as a segment that reflects some of Todd's personal feelings or his outlook on the world. This information in these two FIGURES is only a profile summary, whereby a full profile can be stored within system 10 at a different location.

Note the level of interest rating component to FIG. 3A. An interest level slider bar is used by the end user in order to make selections or designations about potential dating candidates. The slider bar is easy to use and can solicit the end user's thoughts about a prospective mate. (Note that such a slider bar is simply a graphical illustration that simplifies the end user's experience. Other graphical illustrations may include (but not be limited to), a knob, a bar-graph representation, or any other chart, symbol, picture, illustration, or object capable of displaying an end user's interest level.) The level of interest bar is conducive to an expedient disposal of individuals that offer minimal intrigue to the end user. In a similar fashion, the level of interest bar can readily be utilized in order to initiate the next step in the dating process.

If the slider is moved to the right (indicating a strong preference for this particular individual), then the person can be moved to an "Active Matches" tab (i.e. a queue), where the relationship progresses to the next level. If the slider is moved to the left (indicating a low level of interest in this individual), then this person can be placed into an "Archive" where the relationship does not continue. Note that an inference can be made based on the level of the slider bar such that a potential candidate can be immediately directed to an end user's active matches. In other embodiments, there is no default to "Active Matches" and the end user must manually make this decision: no matter his level of interest rating. For example, a simple prompt may be provided to the end user such that, for a proffered candidate, the end user makes an election (e.g. by clicking his mouse to make a selection) for "Active Matches" or "Archive."

The slider bar represents an easy way for an end user to engage in the candidate selection process. Engagement could yield a progression toward a future relationship or it could remove individuals from consideration from an end user's queue. Both of these actions are productive, as both are results-oriented. Deciding not to engage a certain individual is certainly useful, as choices associated with an end user's dislikes are valuable for identifying and proffering new candidates. This feedback information is imperative to achieving a high level of success in an on-line dating environment.

FIGS. 4A-C are simplified screen shots involving an example personality profile to be used in the on-line dating platform. The personality profile reflect a series of fun, probing questions that get to the heart of who the end user is and what the end user seeks or needs. The personality profile explores the complex mix of values, traits, and attitudes that are included in the unique identities and relationship needs for a given group of end users. At the conclusion of the personality profile process, the end user will receive a detailed analysis of their personality profile and a guide to the personality types with whom the end user is most compatible.

In the context of the particular example of FIGS. 4A-C, a given end user's personality profile is illustrated. Hence, this end user (Todd) has completed a questionnaire that revealed his personality type (e.g. director, explorer, builder, negotiator, etc.). The answers to these questions can create a profile or "love map." For example, Todd is designated as having a major personality type of director and a minor personality type of explorer. The responses from Todd are used to match him to potential mates based on the compatibility or congruency in their traits, as reflected by the results of the test.

Consider the case where congruency is not necessarily optimal in the context of a dating scenario. Todd may be extroverted and excessively social, but if his mate shared this character trait, this situation may be unworkable. Character traits may have complimentary effects, whereby strict commonality would not always produce an ideal relationship connection. In other embodiments, the personality profile of FIGS. 4A-C is displayed to the end user concurrently with the personality profile of a potential candidate. Using such a comparison/contrast format, the end user could readily see how his interests and character traits are aligned or dissimilar.

Characteristics of all four personality types can be found within each person, but there is almost always one personality type that is dominant. This is called the major personality type. The test also identifies minor or secondary personality types. An end user may exhibit some aspects of this personality type, though not to the same degree as with the major personality type. In the context of Todd's personality profile, a pie chart is illustrated to signify his personality makeup. The analysis is based on his responses to a questionnaire provided by system 10. The results here identify Todd's major and minor personality types, as well as the personality types that are most likely to be compatible with his personality.

In this instance, Todd's major personality type=Director and his minor personality type=Explorer. Hence, Todd is a DIRECTOR/explorer, which (in the narrative) indicates: "You are courageous; and you seek challenges. You are a tough-minded, independent, and daring thinker who likes to explore ideas or problems thoroughly. You focus easily. And you are persistent, systematic and competent in pursuing your interests and goals. You also assertive; and you enjoy the opportunities your hard work wins. You have a lot of energy. You think quickly, make decisions more easily than most, dislike unnecessary rules, and take a rational approach to people, issues and ideas. You don't often enjoy "small talk." You are generally not interested in pleasing boring people and you gravitate to men and women who are intellectually exciting and get to their point quickly during conversations. You are not conventional in most of your attitudes and values. You tend to be irreverent and pragmatic and you like spontaneous people. You can be an exciting, yet hard driving and exacting, friend and companion."

In addition, in this example Todd is E-Explorer—25%, N-Negotiator—25%, B-Builder—22%, and D-Director—26%. The Explorer element of his personality is known for high energy and high creativity. Explorers seek novelty, risk, and pleasure. Also, Explorers are intellectually curious and not easily swayed by opinion. Todd is also 22% Builder. These Builder individuals are usually popular and have a deep attachment to home and family. Builders exhibit a calm demeanor and low anxiety and are often focused on achieving financial security. Todd is also 25% Negotiator. A Negotiator excels at seeing the big picture, long-term planning, and consensus building. Negotiators are quick witted and intuitive. These individuals are also imaginative and nurturing. Finally, Todd is 26% Director. These individuals are skilled at abstract thinking and short-term planning. Directors are often assertive, competitive, and interested in rank and status. Directors are known for easily making people laugh.

Note that any segment of the test of FIGS. 4A-C can include a Myers Briggs portion for the end user to complete. A Myers Briggs test would reveal some personality traits, which may be beneficial to matching two compatible individuals. Other personality tests could similarly be used in this area of the platform and, thus, are within the broad scope of the present invention.

FIG. 5 is a simplified screen shot of an example home page for an end user of the on-line dating platform. "New Matches" may be based on a compatibility personality profile, which identifies long-term relationship potential through variables such as similar or shared interests, values, background, and goals. Note that the end user's feedback, throughout many of the operations outlined herein, is an integral part of the matching process. The level of interest in potential matches allows system 10 to better understand the end user and what the end user is looking for in a long term relationship. As system 10 accumulates knowledge about the end user's preferences, system 10 leverages intelligence that can refine matching criteria to bring better, more compatible matches to the end user.

As a general proposition, system 10 is designed to learn from end user feedback (e.g. what the end user likes, who the end user likes, what the end user does not like, etc.). Input is integrated into system 10 so that over time system 10 gets a more complete picture of whom exactly the end user is and whom the end user appears to be seeking. System 10 continually learns about the end user. From the first moment the end user makes a dating decision, system 10 begins to gather and compile important data about end user preferences. Throughout the operations of the site, system 10 queries the end user for feedback (e.g. Are you interested in this match? If so, how much? Do you like the way your match answered this question? If not, what is your preferred answer?) Input is immediately processed and used to reevaluate parameters in hopes of offering more compatible matches for the end user to consider.

Figure 6A:
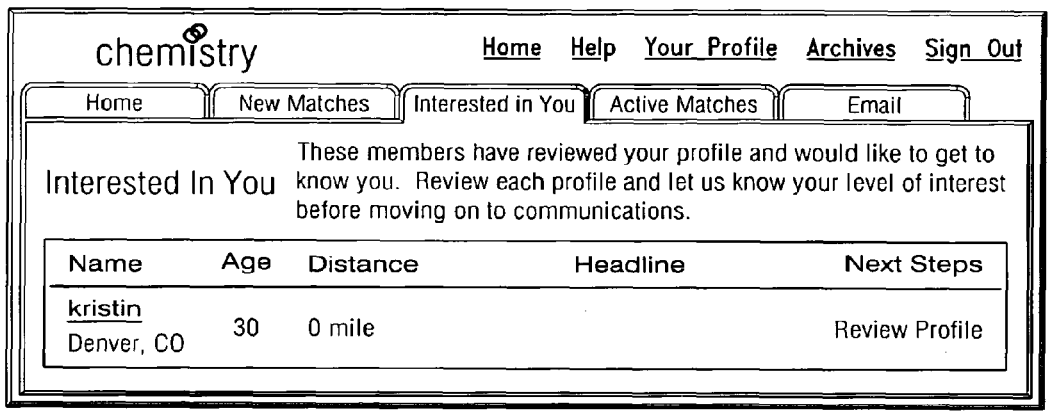
FIGS. 6A-B are simplified screen shots of an example "Interested In You" profile to be used in the on-line dating service.
Figure 6B:
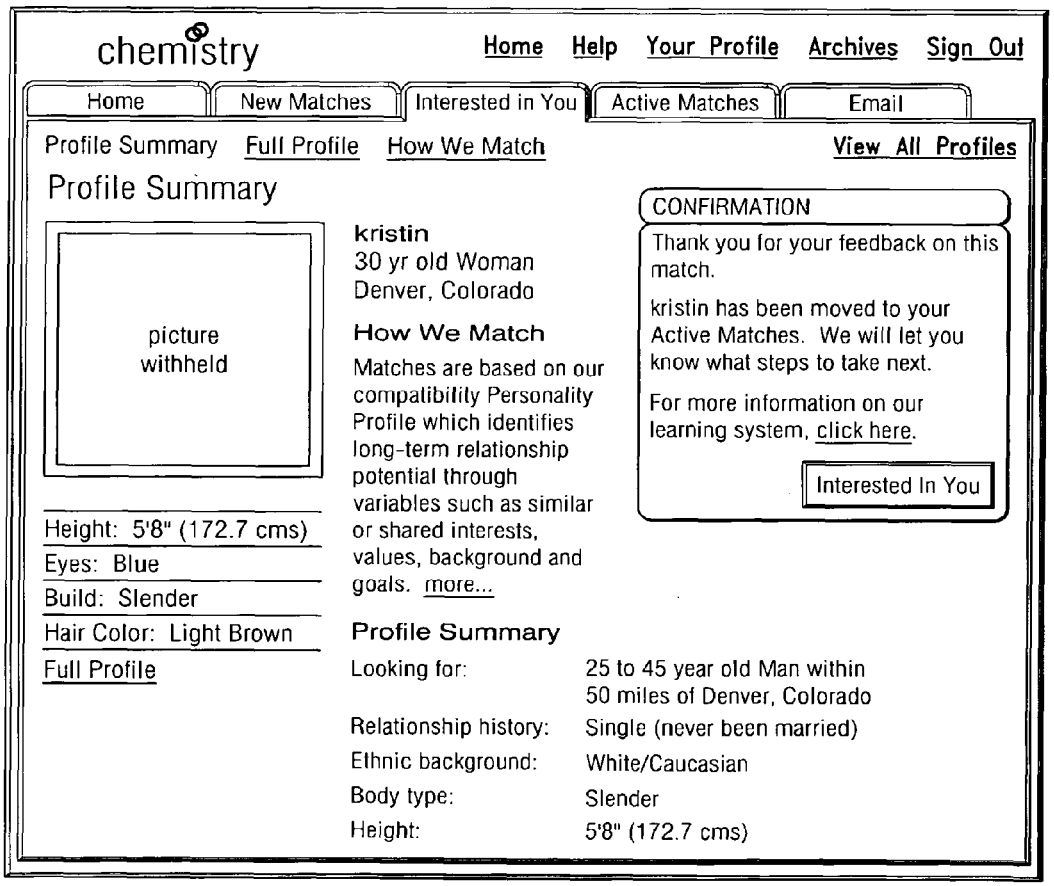
Figure 7A:
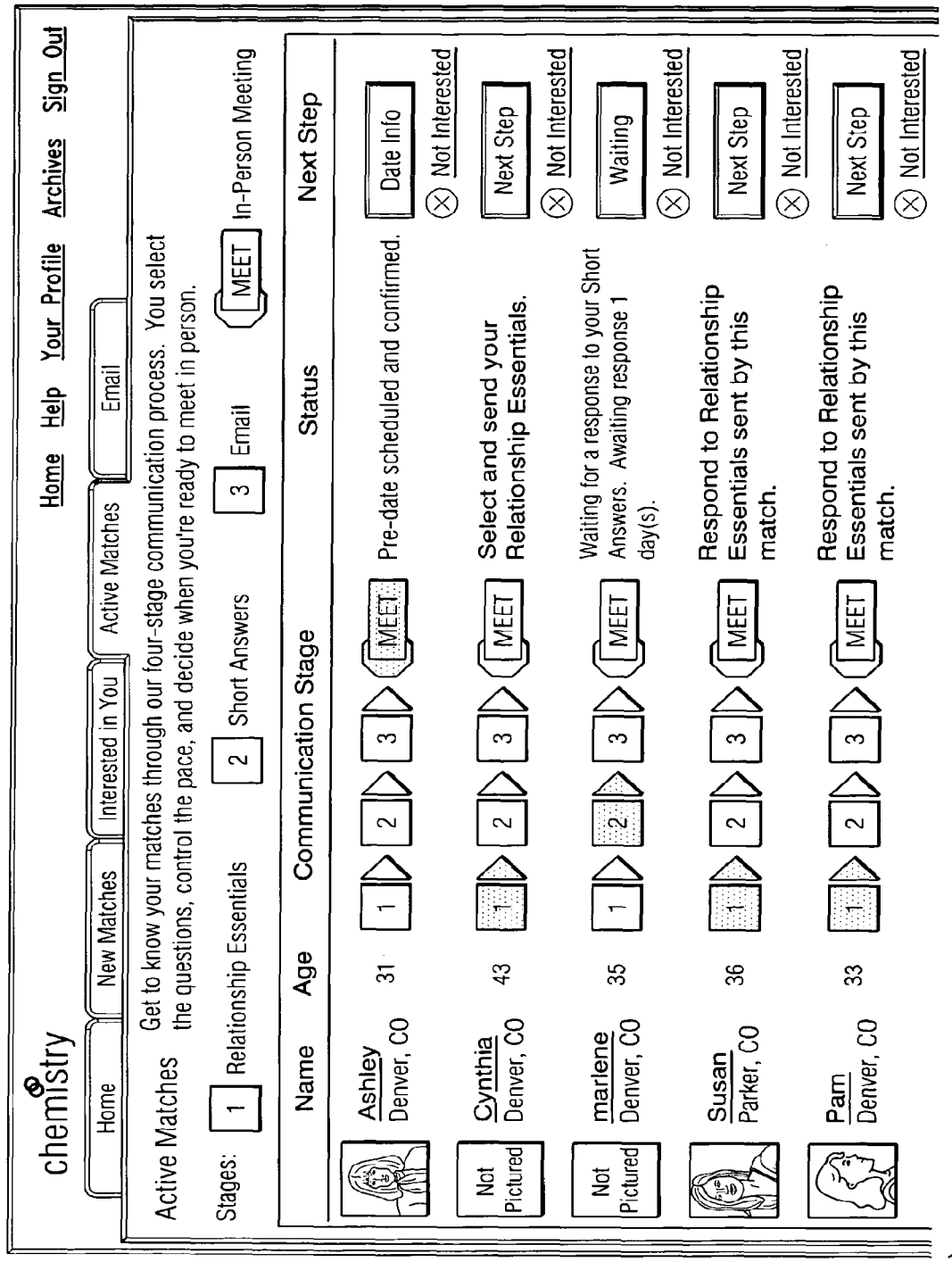
Figure 7B:
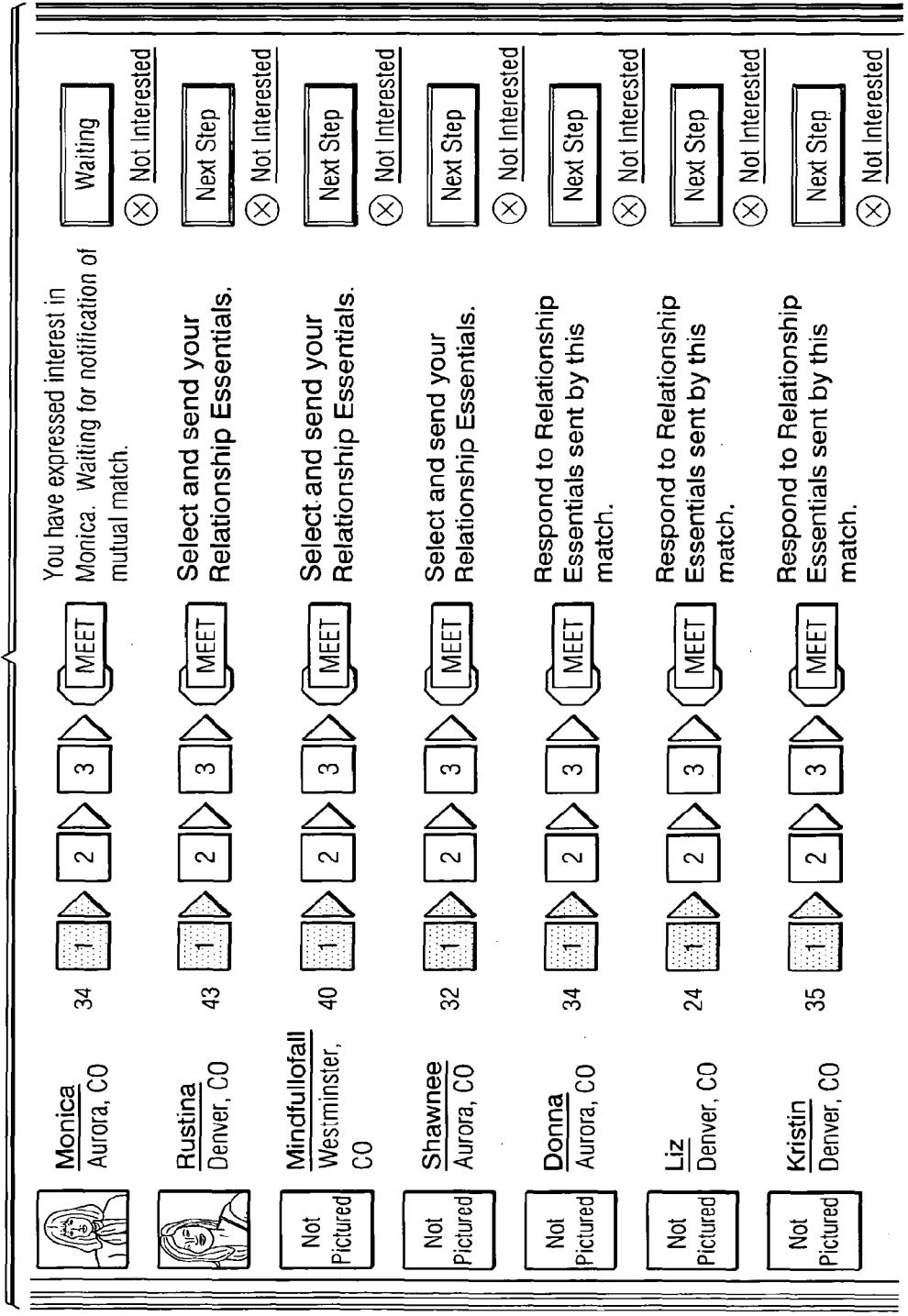
Figure 7C:
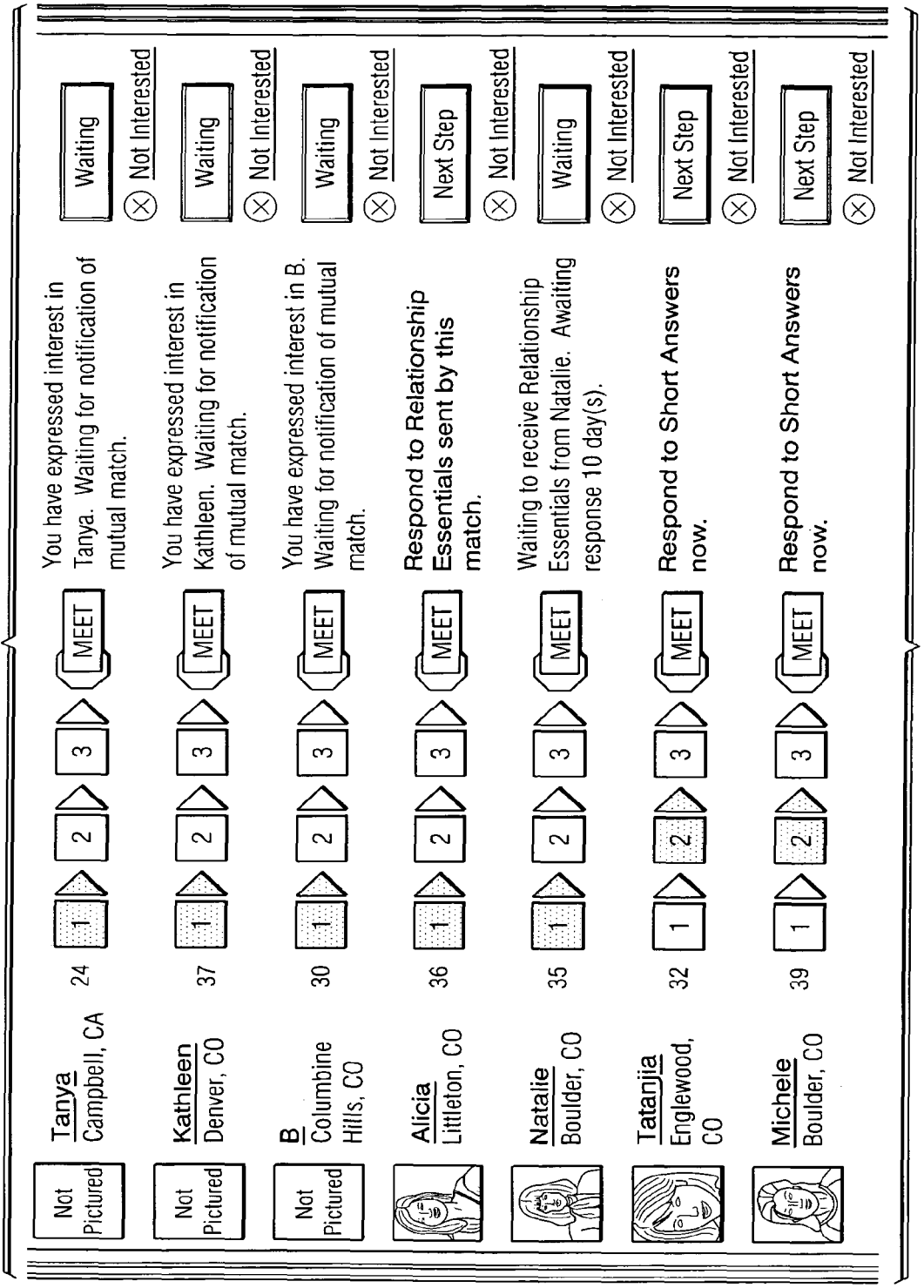
Figure 7D:
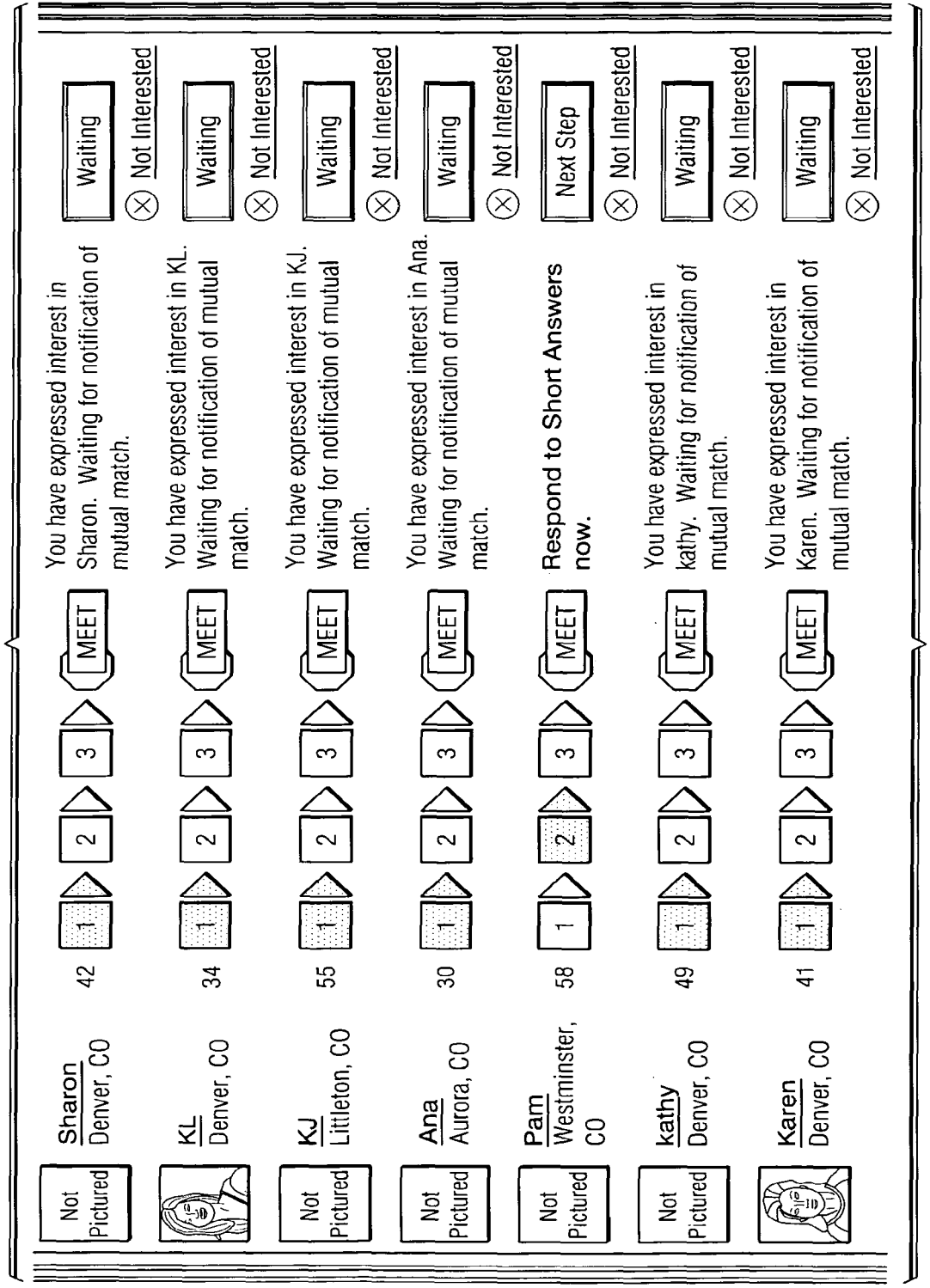
Figure 7E:
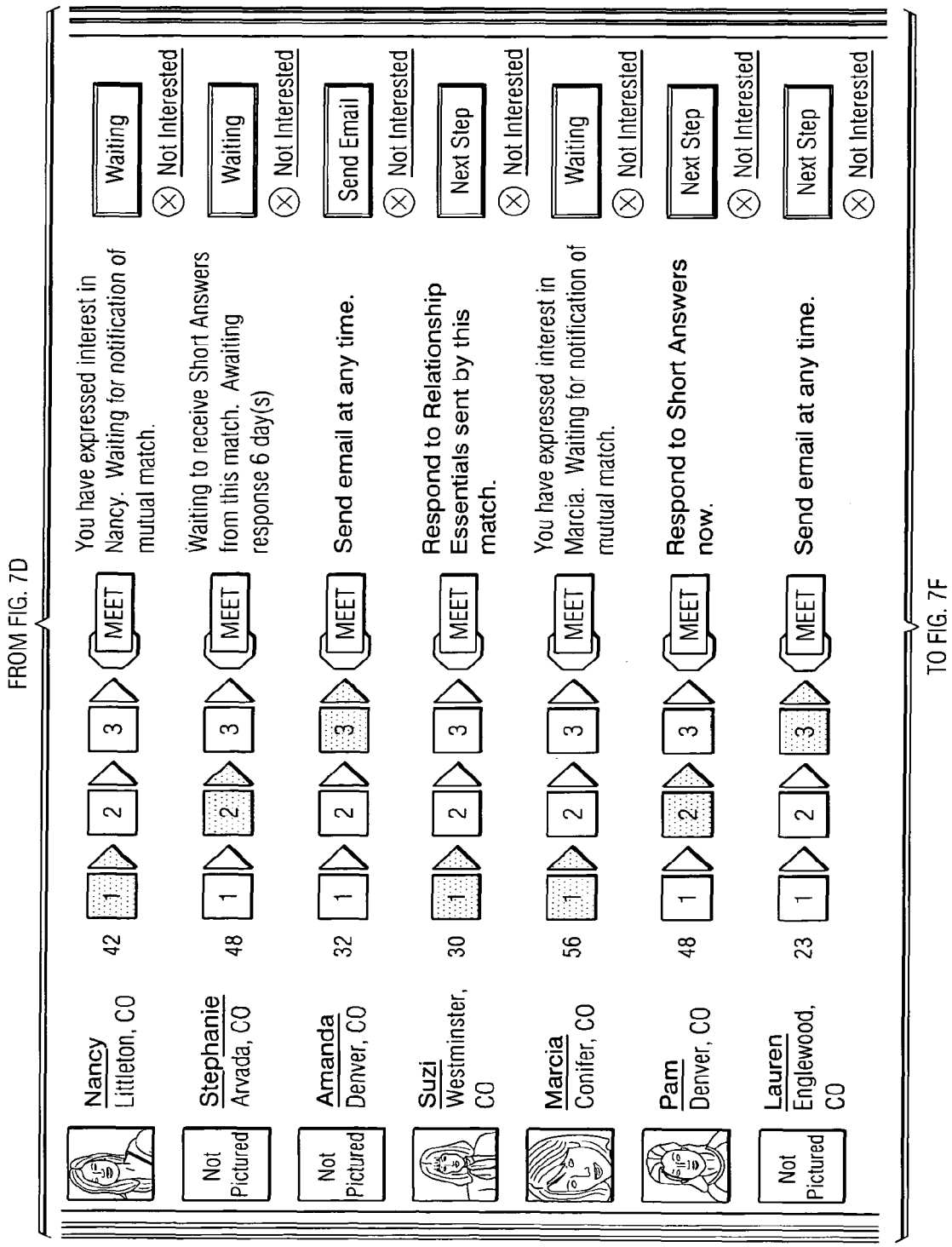
Figure 7F:
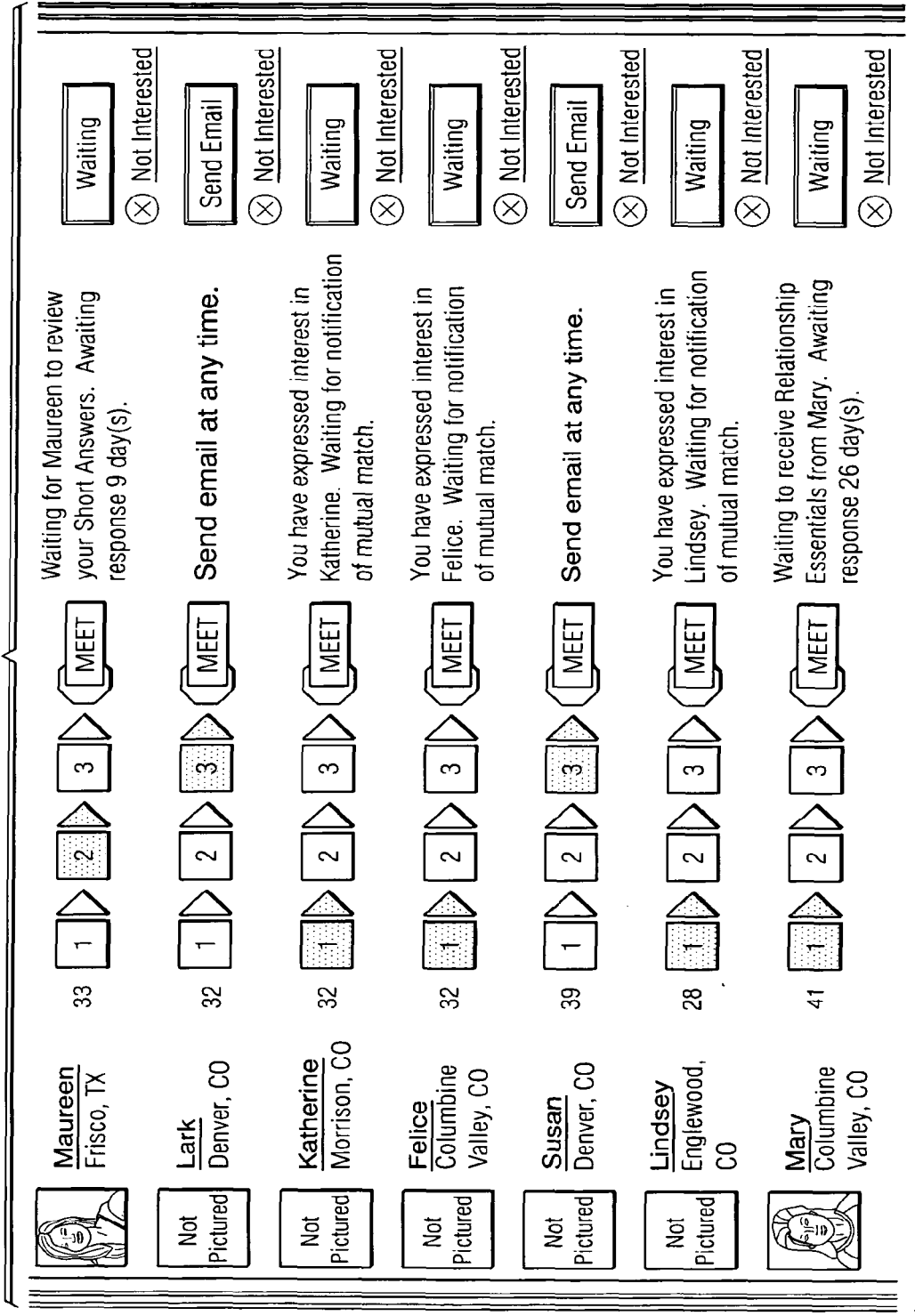
Figure 7H:
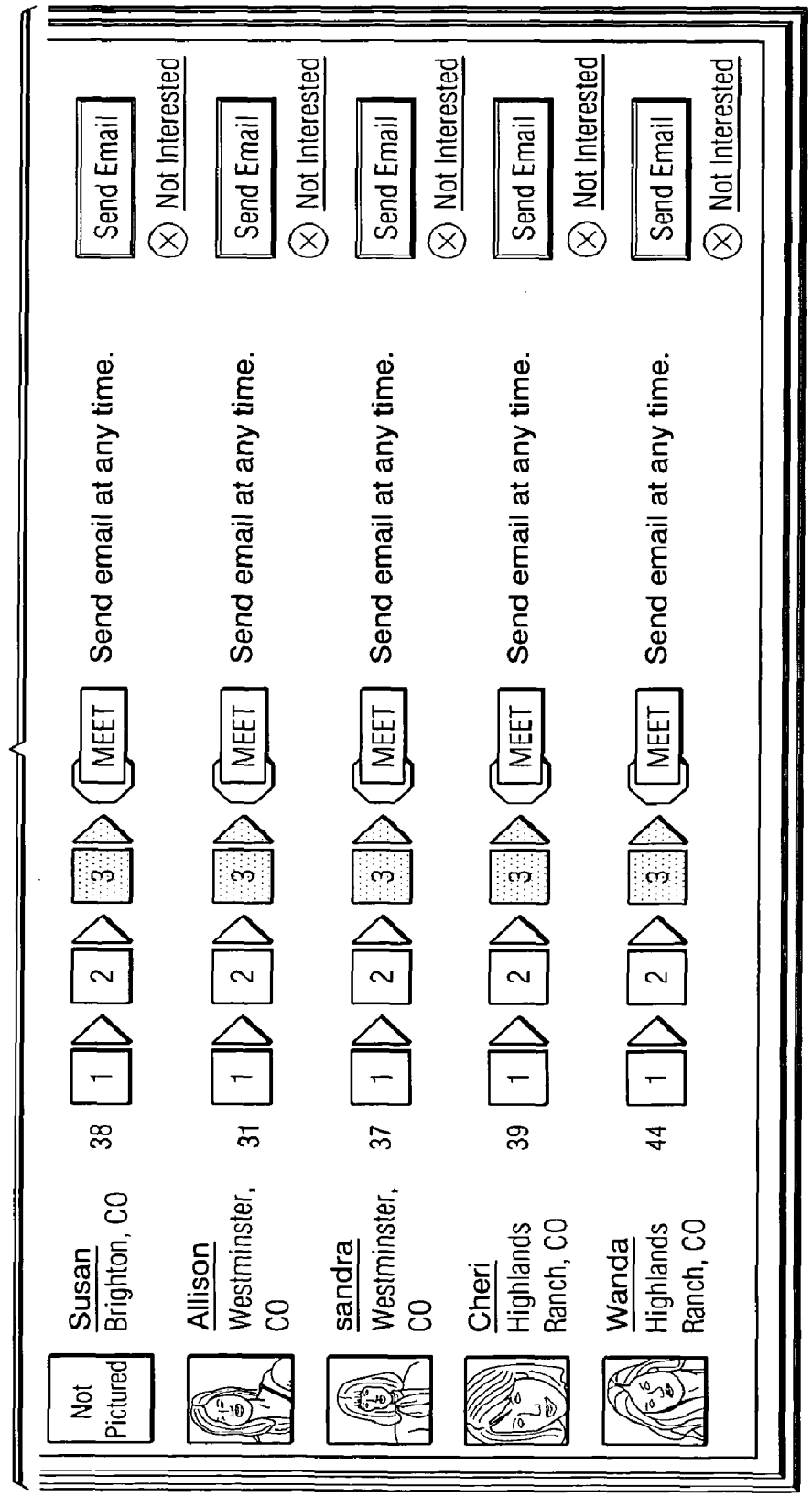

FIGS. 6A-B are simplified screen shots of an example "Interested In You" profile to be used in the on-line dating platform. In particular, FIG. 6A shows that Kristen has indicated a high level of interest in Todd such that she is now in his "Interested in You" queue. FIG. 6B shows Kristen's complete profile, inclusive of her basic information (address, height, weight, etc.), as well as more personal detailed information about her.

FIG. 6C is an example schematic that shows how the "Interested In You" component can operate in one implementation. In one embodiment, there are only five matches that are shown to a given end user per day. This could be provided in an Active Matches queue or in any other type of storage element. Other embodiments include more or less than five matches. Note that there is some intelligent coordination that can take place in such an environment. The following example illustrates such a capability or feature.

In this example, the #2 slot on Todd's list reflects a potential mate named Brooke. However, on Brooke's list of potential matches, Todd is only listed in the #8 slot. Because of his position (and assuming that only five matches will be seen by a given end user), Todd may be seen by Brooke tomorrow, or the day after that, or (in theory) never. Todd's displacement is dependent on new matches that are populated into Brooke's queue.

However, Todd can signal that he is interested in Brooke right now because she is currently occupying his second slot in the list. One positive effect of Todd signaling that he is interested in Brooke is that Brooke will generally rate Todd higher than if she would have simply seen Todd in her Active Matches. This heightened level of attractiveness is fully supported by statistical research and empirical data.

Note that this condition can be exploited in order to achieve greater dating success for the operator of the dating platform. For example, if Brooke is generally rated a "7" but only dates persons who hold a level of "7" or higher, Brooke's queue can be populated with persons having a "6" rating or higher (through manipulation of the "Interested in You" component of system 10). These people will consistently respond to Brooke's picture/profile by indicating that they are interested in her and, subsequently, she will uniformly rate these 6s much higher (e.g. as 7s or greater). Hence, one way to achieve the desired effect is to populate Todd's New Matches with Brooke: this strategy fully expects Todd to indicate that he is interested in Brooke. Once Brooke receives the signal that Todd is interested in her (i.e. Todd shows up in her "Interested in You" queue), then Brooke will rate Todd higher than his "deserved" 6 designation. Once Brooke inputs a level of interest rating sufficiently high, Todd will be placed in an "active state" (e.g. in active matches for Brooke) such that the relationship progresses to a next level. The flow in such a scenario is Interested in You ($1^{st}$ direction), then Interested in You ($2^{nd}$ direction), then relationship essentials, then short answers, then e-mail, and then a meeting. These stages can readily be modified or changed based on particular needs.

FIGS. 7A-H are simplified screen shots of an example listing of active matches to be used in the on-line dating platform. These people are identified by searching through the entire membership to find the individuals whose personality profile matches that of the end user. Ideally, the two matched individuals have shared values, similar goals, and complementary traits. The end user is not overwhelmed with hundreds of match possibilities: most of which would prove fruitless. Instead, the intelligent matching system brings an end user a few, highly-compatible matches to consider.

In one embodiment, the evolution of the relationship is as follows: 1) relationship essentials; 2) short answers; 3) e-mail; and 4) meet. In other embodiments, these stages are altered considerably. For example, short answer questions could begin the dating process, whereby stage two would be relationship essentials, followed by short answers and then e-mail.

Figure 8:
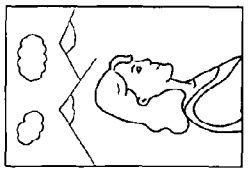
FIG. 8 is a simplified screen shot of an example summary profile to be used in the on-line dating service.

FIG. 8 is a simplified screen shot of an example summary profile to be used in the on-line dating platform. FIGS. 9A-B are simplified screen shots of an example full profile to be used in the on-line dating platform. FIG. 10 is a simplified screen shot of an example matching to be used in the on-line dating platform. This FIGURE illustrates an example matching protocol.

Figure 11:
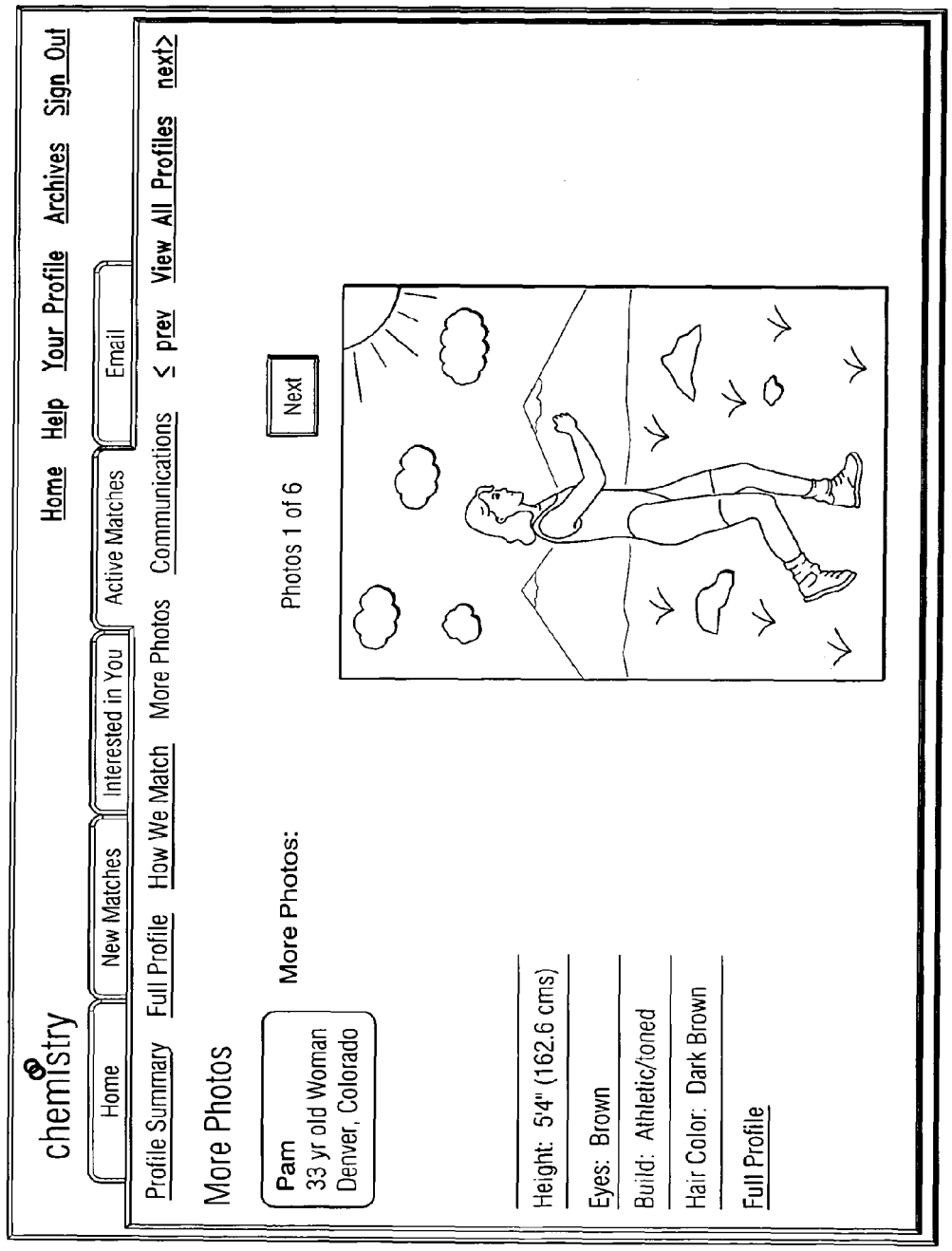
FIG. 11 is a simplified screen shot of an example photograph to be used in the on-line dating service.

FIG. 11 is a simplified screen shot of an example photograph to be used in the on-line dating platform. In this instance, the end user has chosen a series of photographs: some of which are more austere, whereas others are more informal and depict the end user in a more relaxed environment. The end user is also provided with the ability to select primary and secondary shots. In one example, the primary and secondary shots correspond to head shots and to body shots/action shots respectively. For real estate applications, a primary shot may be the front of the house, whereby a secondary shot is the yard or the interior of the house. Virtually any designations could be provided for primary and secondary shots in any given application (e.g. real estate, on-line dating, job applicants, etc.). The designations of primary and secondary shots here are arbitrary and have only been used in order to provide some examples (amongst many) for the audience to review.

Figure 12:
FIG. 12 is a simplified screen shot of an example slider bar to be used in the on-line dating service.
Figure 13D:
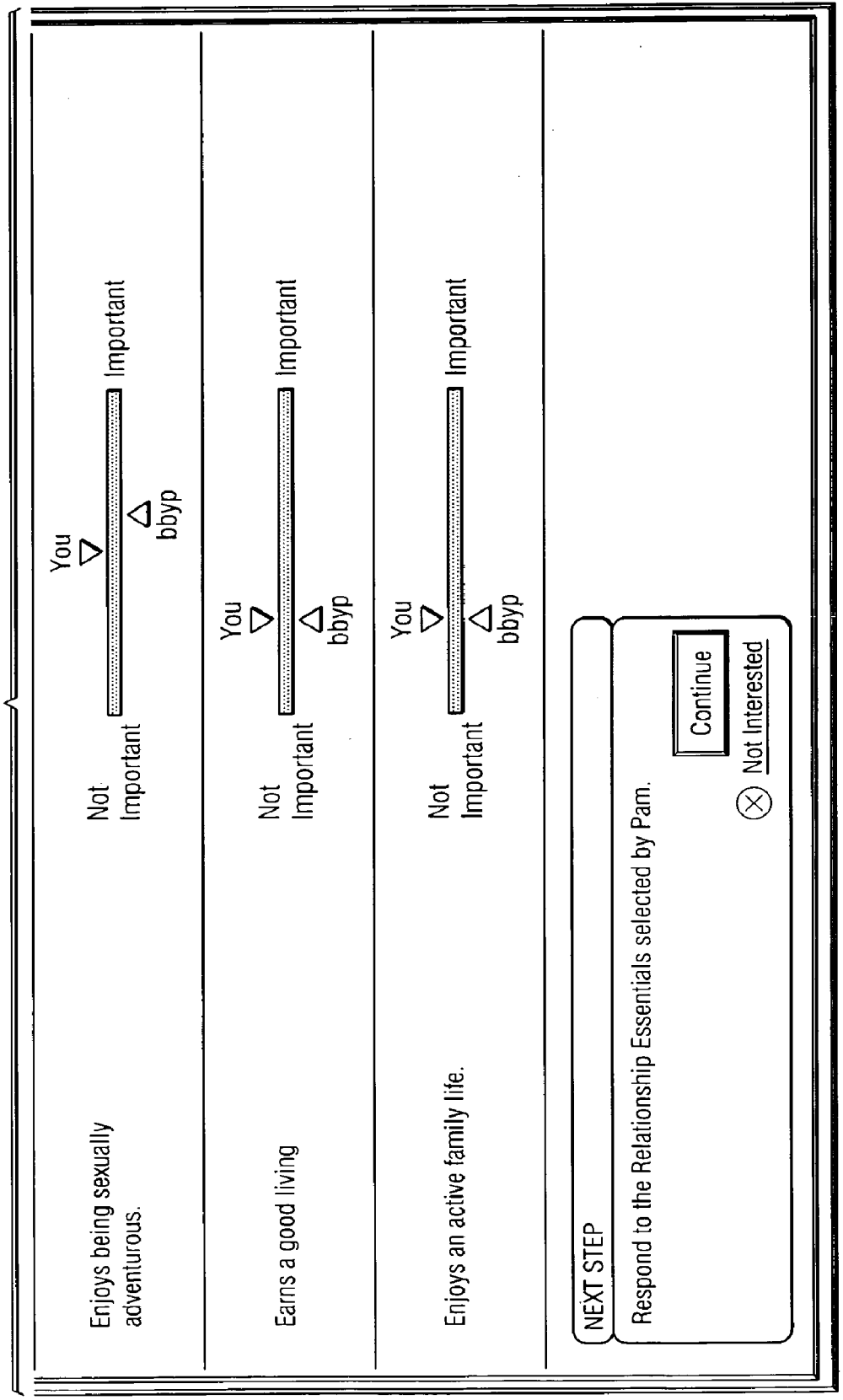

FIG. 12 is a simplified screen shot of an example slider bar to be used in the on-line dating platform. FIG. 12 reflects Todd's high level of interest in Pam. Note that there are two components of the slider bar configuration that should be appreciated. First, the slider bar engages the end user in a benign but direct way. Second, the designation on the slider bar that is made by the end user represents a quantitative value to be understood by the operators of the web site. For example, the slider bar could have corresponding numeric values that are not visible to the end user. Hence, a high interest level could correspond to a numeric value of '9' and a low interest level could be a '3.'

This rating scale can be used to aggregate scores and to identify an average rating value for a particular individual. For example, if Todd rated his interest level of Pam as moderately high, that designation would be correlated to an '8' rating, which could be added to other end user's interest ratings of Pam. Although Todd has evaluated Pam as an '8,' her true average score could be only a '6.' Because Pam's aggregate score is a '6,' Pam would be placed into other Active Match queues of people who are also in this 6 category. Stated differently, if Pam had an average interest rating of 6, then she would be matched with other 6s.

This matching of people with (approximately) equivalent level of interest ratings is performed because such matching yields the most success. This result has been proven through statistical data, which tracked the patterns of people who shared similar level of interest ratings. Some of this data is associated with the field of anthropology, but is nonetheless grounded in simple logic. While it is true that the person having a '1' rating can successfully date a 10-rated person, this scenario (on average) is not as likely as a relationship in which two people share a 7 rating. As a total population, people having commensurate scores are more apt to move further along in a dating process than mismatched individuals.

Thus, Pam could have her Active Matches populated with other similarly rated individuals (e.g. 5s, 6s, 7s). To Pam, the choices are all relative (i.e. Pam would not necessarily realize that she is being shown nothing but 6-rated people and, accordingly, she would arbitrarily rate this group of people (e.g. as 4s, 9s, 10s, etc). This phenomenon is associated with 'positive associative mating', which is part of a growing body of anthropological research.

FIGS. 13A-D are simplified screen shots of example relationship essentials to be used in the on-line dating platform. The relationship essentials allow for a comparison of answers between two people. Moreover, the relationship essentials allow participants to focus on issues that matter to them. The guided communication process takes an end user through four stages of discovery. Relationship essentials help to explore what is truly important (and what is not important) in a relationship. The second stage, short answers (which is detailed below), asks the end user to respond to intriguing questions in their own words. In this example, email is the third stage, enabling an end user to begin an open correspondence with the selected matches. Stage four is the pre-date, where the end user meets the selected match in person. Note that at any stage, the potential match can be closed without questions, explanations, or awkward moments.

Figure 16:
FIG. 16 is a simplified screen shot of an example short answer response to be used in the on-line dating service.

FIG. 14 is a simplified screen shot of an example short answer introduction to be used in the on-line dating platform. FIGS. 15A-C are simplified screen shots of example short answer questions to be used in the on-line dating platform. FIG. 16 is a simplified screen shot of an example short answer response to be used in the on-line dating platform.

There could be a multitude of questions, which could be used to explore the personalities and character traits of the participants. In one example, an end user is asked to select five of the questions: the answers of which may be important or intriguing for the end user. These are the questions that will be presented to the active match that is being targeted (in this case, the active match is Pam). Hence, a given end user is afforded the opportunity to ask probing questions about subject matter that has significant value to that particular end user. (Note that in other embodiments, the end user can develop their own questions to be asked to a potential mate. This ability to exercise creativity in querying a potential mate for certain information can be provided at various stages of the dating process.)

This level of precision in asking questions that are pertinent to the end user's fundamental value principles yields greater success in an on-line dating environment. In addition, this level of specificity and the actual question selection process is generally not provided in similar dating systems. What is imperative in this whole process is the ability to relay the information that is most important to the end user at an early stage. Consider a simple questionnaire that does not account for an end user's preferences. Questions could focus on politics in the Middle East, the most romantic city a given person has ever visited, or feelings about a person's most recent breakup. But, these questions are useless if none of these topics are vital to an end user's calculus in electing whether to pursue a relationship with another participant. The present invention addresses this issue, and others, in providing an optimal user-configurable system that resolves these deficiencies. System 10 offers flexibility to the end user by allowing them to choose the questions to be posited to a potential match.

The questions could be provided in a simple multiple choice format for purposes of simplicity. Other formats (e.g. true/false, fill in the blank, short answer, etc.) could also be readily used. Brooke would be sent this list of questions to be answered. Brooke would select her preferred responses. Both individuals (the end user and Brooke) will be completing the same questions independently without knowing how the other participant responded to these questions.

Once both parties have completed the questions, each party is then presented with the answers. More importantly, the answers of the potential mate can be viewed in the context of their own answers. This allows the end user to see exactly how the other party shares specific interests or how truly disparate responses are from one another.

Note that the answers submitted by both parties can be used by algorithms that process this feedback. For example, if Todd answered any of the short answer or multiple choice questions associated with money as "A penny saved is a penny earned" then such a response would be matched to other users who responded in a similar fashion (not necessarily verbatim, but conceptually). In this sense, there is a constant feedback loop that is present in system 10, as each piece of data is considered in the evaluation of future potential matches.

Figure 17:
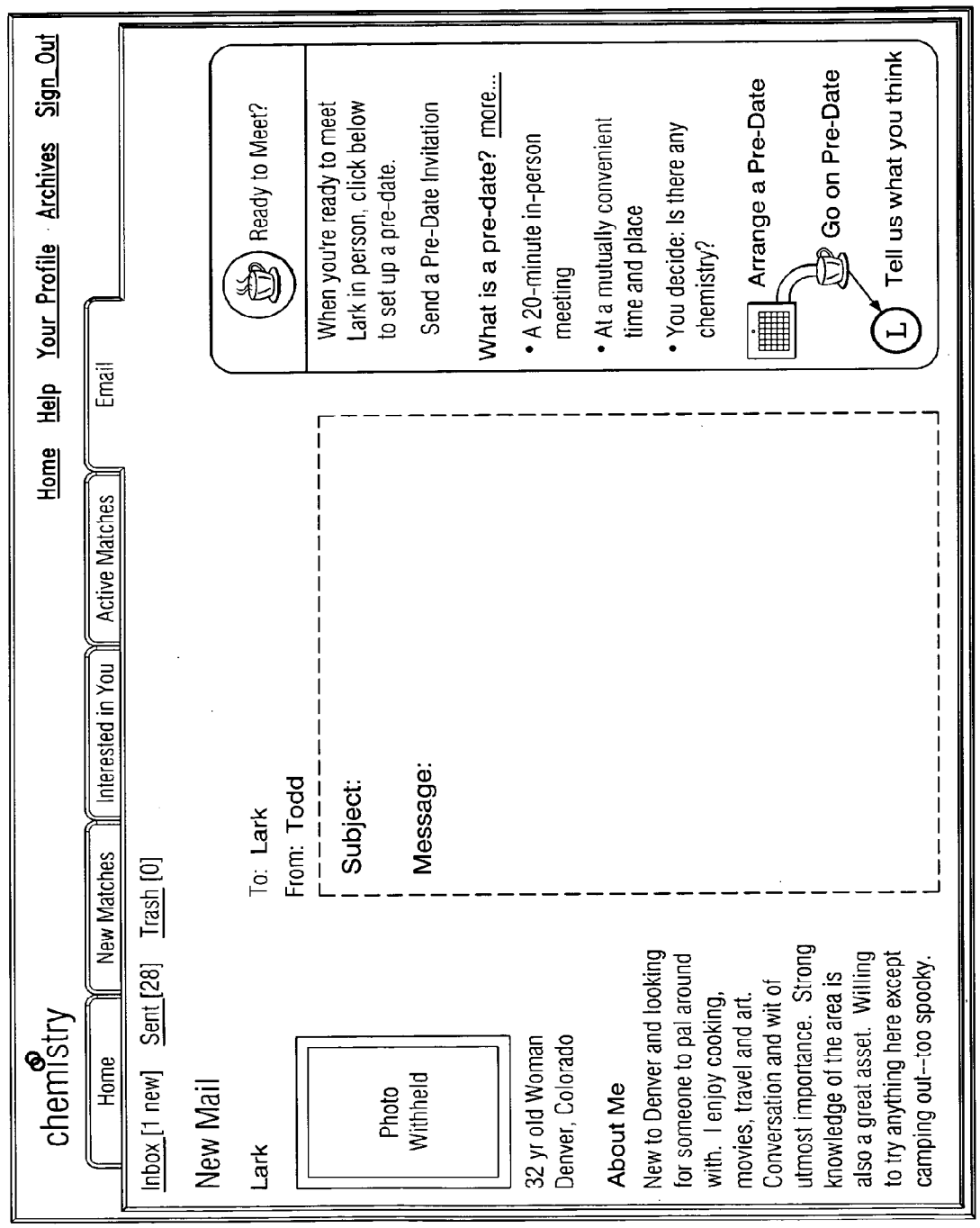
FIG. 17 is a simplified screen shot of an example "Ready To Meet" introduction to be used in the on-line dating service.
Figure 18A:
Figure 20:
FIG. 20 is a simplified screen shot of an example suggestion of where to meet to be used in the on-line dating service.
Figure 21:
FIG. 21 is a simplified screen shot of an example post-date questionnaire to be used in the on-line dating service.

FIG. 17 is a simplified screen shot of an example "Ready To Meet" introduction to be used in the on-line dating platform. FIGS. 18A-B are simplified screen shots of an example pre-date profile and scheduling protocol to be used in the on-line dating platform. FIG. 19 is a simplified screen shot of an example pre-date confirmation to be used in the on-line dating platform. FIG. 20 is a simplified screen shot of an example suggestion of a location to meet to be used in the on-line dating platform. FIG. 21 is a simplified screen shot of an example post-date questionnaire to be used in the on-line dating platform.

After the short answer phase has been completed, the parties can agree to move to stage three, which is the e-mailing stage. Note that the end user can skip the last stage in the progression by simply e-mailing the other party in order to determine whether or not the other party would feel comfortable meeting sooner. If the other party agrees to skip stage three, then both participants can progress together to a potential meeting.

Note that both participants input their zip codes when their profiles are established. The platform can take that address information and use it to find an optimal dating location. Both participants can also provide contact information such that if either person is running late or needs to cancel the meeting, the other person can be notified. A pre-date is a short, low-pressure, in-person meeting between an end user and the selected match. The pre-date may be thought of as an intermediate step between email and a full-fledged date, which may be inclusive of dinner. System 10 can work to find a mutually-convenient time and location for the meeting, but the end user is welcome to suggest a time or place that works better for the two participants. Both participants can designate their availability and their general dating preferences.

This information generally will be used to find a mutually convenient time and place for participants to meet. Except for the details regarding availability, this information will not be shared with the potential match.

Hence, system 10 can operate to integrate the schedules and preferences together in order to identify a mutually agreeable location. The first date location could be a coffee shop, a restaurant, a bar, a park, a library, or any other appropriate location for these individuals to meet. Hence, a simple coffee encounter could be replaced by a lunch, a dinner, a movie, a round of drinks, etc. Note that a simple call could be placed twenty minutes after the date has begun in order to signal that the date should end. In other embodiments, a call could be placed to extricate someone from a terrible dating experience. This could be done in the context of a longer date, whereas one person is simply not enjoying the dating experience and the date is scheduled to continue for several more hours.

By setting up a call in the first scenario (i.e. a coffee encounter), the onus is then removed from either party to truncate this initial meeting. Note that voice-mail or text messages can be sent to either user in cases where an individual is running late or cannot make the pre-date meeting. The appropriate contact information could be provided in the pre-date profile stage. The platform can autonomously trigger a query for both participants in order confirm that the date occurred. If it has, then the system offers a final feedback opportunity for both participants. Hence, once the date has concluded, both parties can return to their computers and signal their thoughts on how the date occurred. A series of questions can be used in order to solicit important responses from the end user. For example, a given end user could be asked: 1) Was your date on time? 2) Was she interesting? 3) Was she a good listener? 4) How was the chemistry between the two of you? 5) Was she well-mannered or polite? 6) Did her photo match her appearance? Chemistry is an essential quality of every successful relationship. The sooner an end user can find out if there is chemistry between him and the selected match, the sooner the end user will know whether or not this is a relationship worth pursuing.

The most important question of the post-date follow up could relate to whether or not the end user cares to see this person again. Note that the responses from the post-date follow up are an invaluable tool for the operator of the website. The responses reflect important character traits that can be fed back into the system for future matches. In addition, the operator can offer constructive feedback to an end user who appears to be struggling in some area. Thus, a cumulative average (e.g. after three or more dates) could be taken of several questions, whereby a single area can be pin-pointed for improvement. This is verifiable, informative, and truthful dating information for the end user to consider. Note that such a "dating report card" is simply missing in the area of on-line dating. In some cases, an end user may only need to tweak certain aspects of his dating makeup in order to achieve the desired result. For example, a given end user may be habitually late or he may not dress appropriately. By admonishing him (in a professional way) about these deficiencies, he can correct these inadequacies in order to increase the likelihood of him finding a successful relationship. In other scenarios, the end user may be counseled on how to better highlight his strengths in his profile or how to better phrase questions for potential matches. Thus, such dating advice is highly specific and, furthermore, could extend to any of the components identified herein in this patent application.

In one embodiment, in cases where the date went extremely well, the other end user is only shown a positive sentiment associated with the encounter. The results of each question are not necessarily sent over to the other side in this particular embodiment. Other embodiments may include a full disclosure of the exact responses from the reciprocating end user. In cases where the end user has scored poorly in the post date follow up questionnaire, that negative information can be minimized or toned-down in order to spare the feelings of the other person. In such an instance, the end user receiving the negative feedback would only receive a benign message signaling that his counterpart did not enjoy herself or that she would simply not be interested in pursuing a future relationship with this person. Note that using such a protocol obviates concerns of those individuals who are reluctant to answer post date feedback questions honestly for fear that those responses would be shown to the other participant.

Another component of the present invention allows the end user to turn ON or display their own feedback such that other users can see how this person is generally reviewed. The person whose feedback will be made public can have the option of participating in such an arrangement or elect to keep this information confidential. In this arrangement, other members of the on-line community can see how this person is systematically reviewed (e.g. after 3-5 dates). For example, the end user may be consistently reviewed by others as "a good listener" which may be the very quality that certain persons are seeking. Other feedback could include items such as: "his photograph was accurate" or "he was 20 minutes late." Virtually any information can be shown to the on-line community, whereby a certain amount of control is exercised by the person whose information is about to be disclosed to the public. This feature allows for greater transparency for other members of the on-line dating community, as truthful information is being presented for other end users to consider.

Yet another feature of system 10 relates to a limited search tool, which can be executed by a given end user. The term "limited" in this context only relates to the operator's desire to confine or to restrict such searching capabilities. In other embodiments, the end user may be able to freely search: unfettered by restrictions imposed by an operator.

This freedom to search for any type of person allows a person to express interest in people that he would not otherwise find (i.e. that would not be sent to his "Interested in You" tab). For example, the end user may elect to go outside his normal criteria in search of a potential mate. In a similar fashion, the person identified in the search may not be expecting to see such an individual in her "Interested in You" box. Consider a case where the identified woman in this case is adamant about not dating people who smoke and the person performing the limited search is a smoker. She will see this particular end user in her "Interested in You" tab and wonder if she has configured her preferences properly.

One way to address this lack of congruency is to provide an additional tab (or a sub-tab) for her in order to indicate that there are other people (outside her normal circle of interest) that have expressed interest in her. Thus, a simple "Other Interested in You" tab could be provided for her and she could elect whether or not to engage this person in conversation or questions, etc. In another embodiment, there is not a special tab for these (unexpected) individuals and the receiving party can simply ignore these end users or archive these individuals immediately.

FIG. 22 is a simplified screen shot of an example limited search criteria template to be used in the on-line dating service. In one embodiment, the search component includes a first section (e.g. basic search criteria) and a second section (e.g. an advanced search criteria). Basic search criteria include rudimentary parameters such as demographics, height, weight, etc. Advanced search criteria are more involved, as they pertain to more conceptual queries (e.g. a desire to have a big family, thoughts about money, political outlook, etc.).

In operation of an example flow, consider a case where there are five new matches in the Active Matches tab and an end user indicates that he has interest in only one of the five (the other four being sent to the archive). The end user can be afforded the opportunity to perform one limited search (e.g. one per day) in order to identify other participants who meet specific criteria in which he is interested. For example, the end user may have detailed criteria concerning the age, physical activity level, and education of a potential mate. Criteria can include any of the profile information identified herein. The search criteria can also include any of the items illustrated in FIG. 22 (or any of the items provided in the other FIGURES included with this patent application). Other parameters of interest to a given end user could readily be used for search purposes and, thus, are included within the broad scope of the present invention. The present invention is replete with any such alternatives and, accordingly, should be construed as such.

The platform allows the end user to search the system using any selected parameters and, further, the platform can re-populate the Active Matches list with these newly discovered individuals. The limited search can be run on central web site 18 or on supplemental web site 20 or be executed on other devices (e.g. end user devices).

Figure 23F:
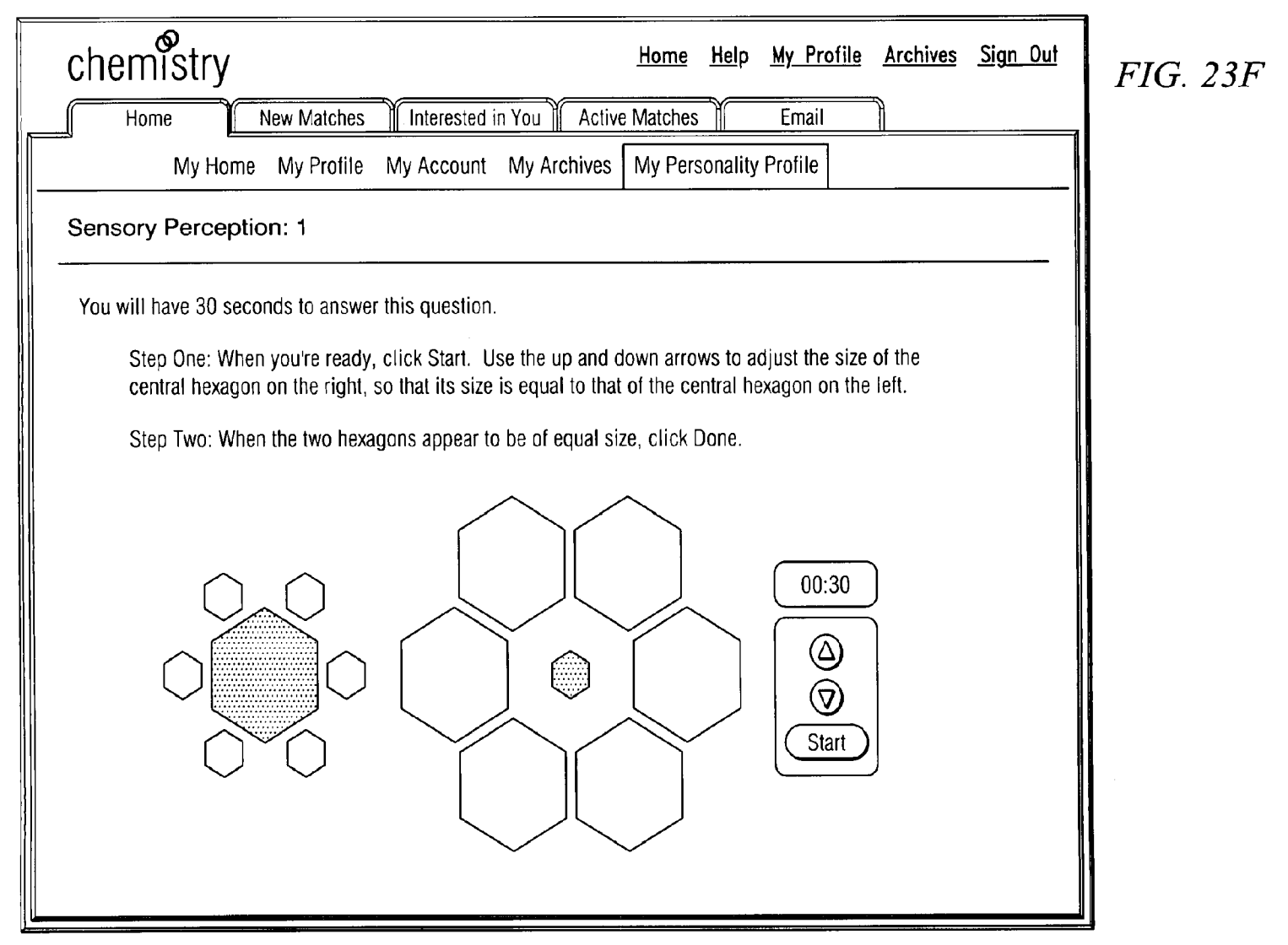
Figure 23G:
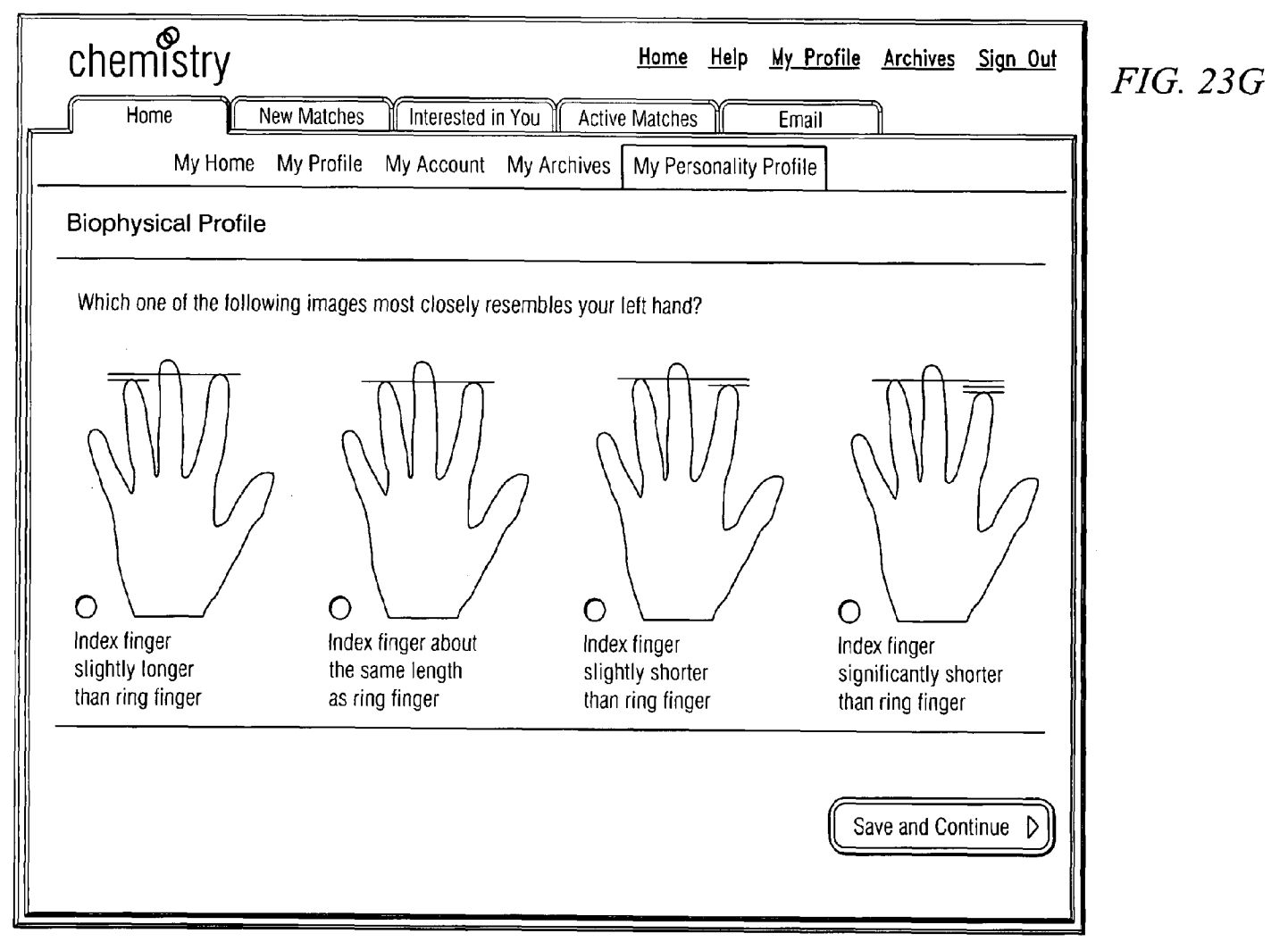
Figure 23H:
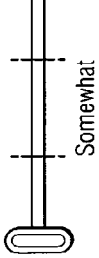
FIGS. 23A-S are simplified screen shots of an example introductory phase to be used in the on-line dating service.
Figure 23J:
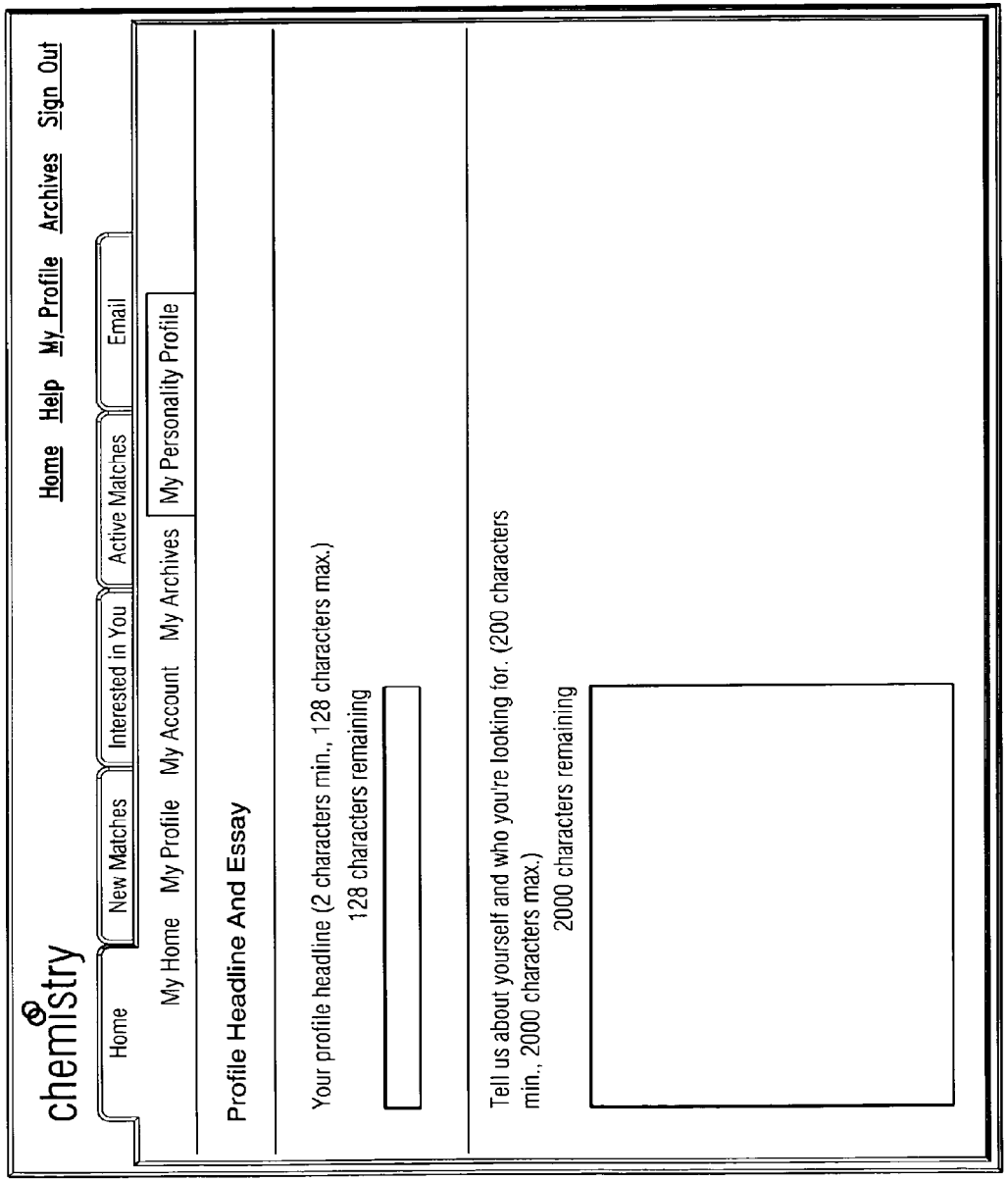
Figure 23N:
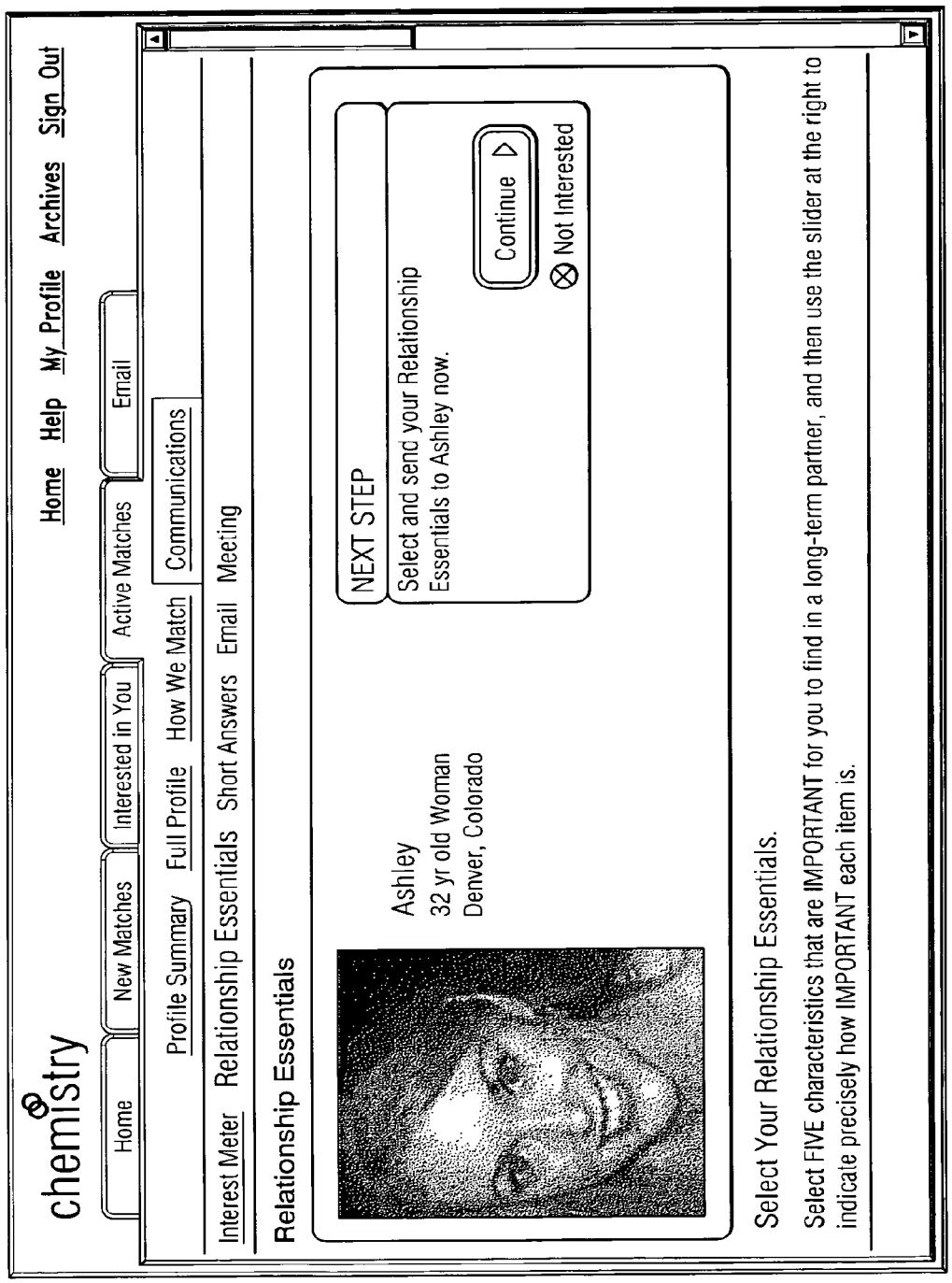
Figure 23R:
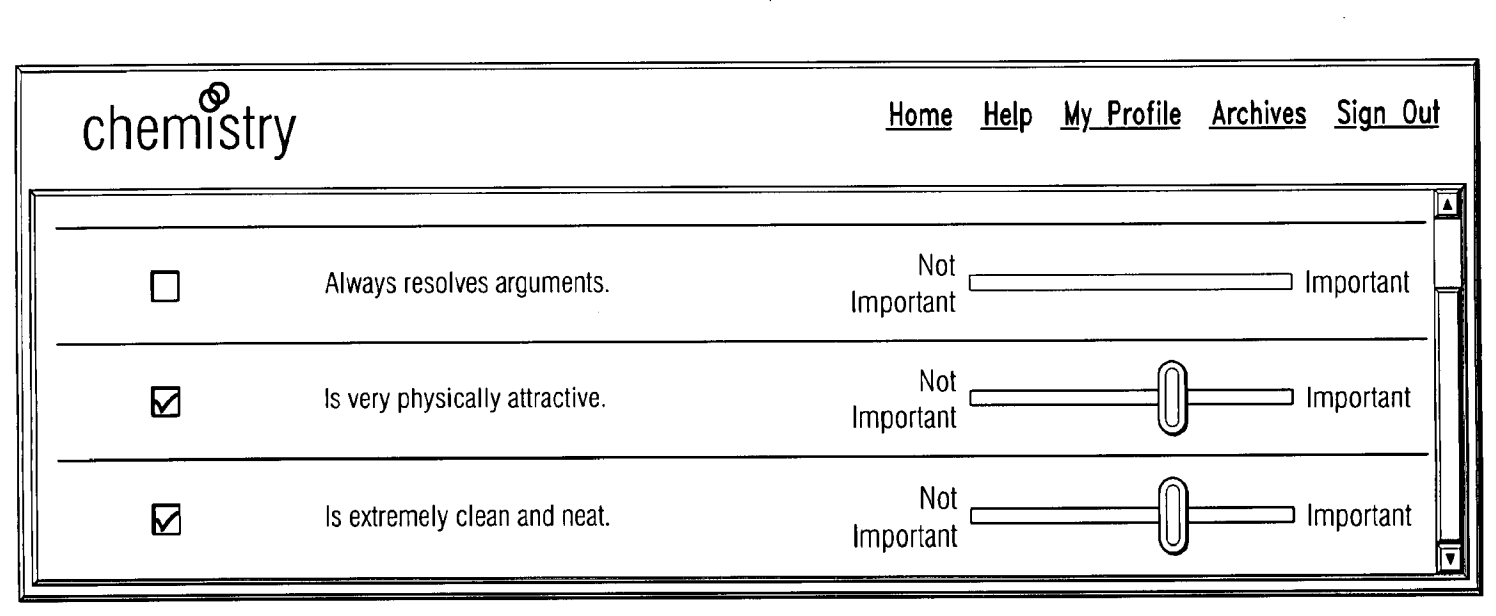
Figure 23S:
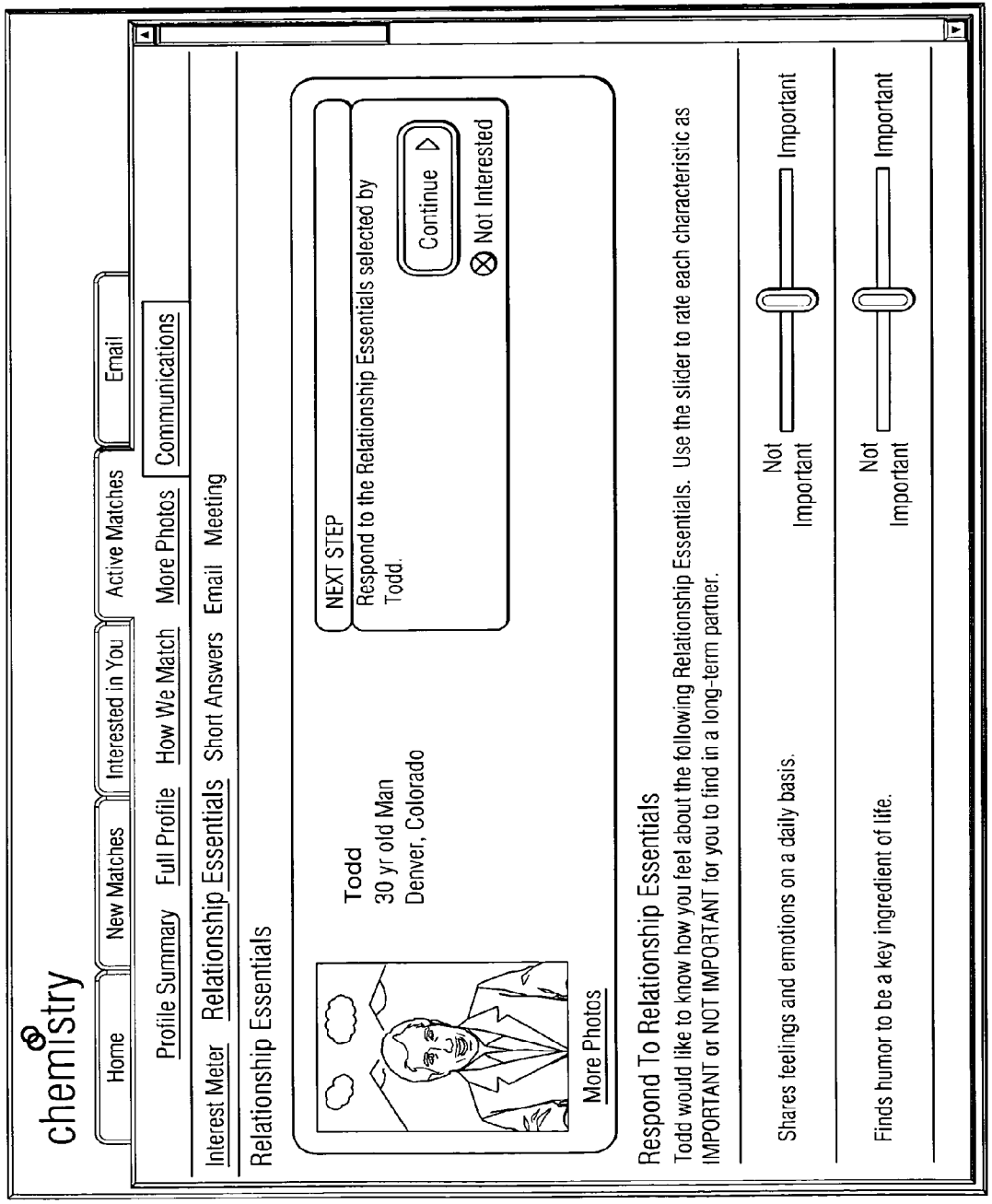

FIGS. 23A-S are simplified screen shots of an example introductory phase to be used in the on-line dating service. FIG. 23A illustrates an example home page for initiating the dating experience. FIG. 23B depicts an example personality profile set-up, while FIG. 23C illustrates a core questionnaire component of the platform in which en user's are asked questions about their fundamental ideologies. Universal traits are queried in the segment illustrated by FIG. 23D.

FIG. 23E illustrates a non-verbal communication screen shot in which a person is asked to give their interpretation of a particular scene. This information can be used in processing and generating an accurate profile for a given individual. FIG. 23F relates to sensory perception, as the end user is asked to complete a quick test under a time constraint. FIG. 23G relates to a biophysical profile for the end user, who is asked to describe their own hand.

FIG. 23H simply queries the end user for his preferences for ethnicity, religion, etc. It should also be noted that an accompanying slider bar is provided to gauge the importance of each of these qualities. FIG. 23I illustrates a dual-slider bar in which two elements are considered together. A profile headline and essay are requested in FIG. 23J, which solicits additional thoughts from the end user.

FIGS. 23K-L illustrate how two people are matched using all of the information provided previously. This intelligent matching is a result of numerous algorithms and (potentially) judgment calls or configurations made by managers of the platform. The weight of this information may be based on anthropological considerations, scientific studies, levels of testosterone/estrogen, and/or any other designation (which may be simply a choice made by one or more operators of the web site). Considerable flexibility is provided by the platform of the present invention, as virtually any parameter may be evaluated, considered, and accorded a selected weight for purposes of enhancing the dating experience for the individual.

FIG. 23M illustrates this particular end user's personality traits as compared to his counterpart (Liz) Note that in this case (as illustrated by the graphical illustration), there is good congruency in character traits between these two individuals.

FIG. 23N illustrates how the end user is prompted to send their relationship essentials to a potential match. FIGS. 23O-P illustrate an end user selecting seven (7) relationship essentials to be sent to their dating counterpart. FIGS. 23Q-R illustrate an example relationship essentials layout. A number of slider bars are provided to make end user selections in this regard. Finally, FIG. 23S illustrates a solicitation for responding to Todd's relationship essentials.

As evidenced by FIGS. 23A-S and by the accompanying description, this introductory phase focuses on the true interests and preferences of members of the on-line dating community. The information gathered is solicited in different ways and is highly interactive. Moreover, such tests are fun and easy to complete, as the end user can quickly navigate thought these preliminary steps. However, their simplicity should not hide their significance; these tests provide critical information that is to be used in addressing compatibility issues and, furthermore, enhancing the chances of long-term dating success.

Figure 24F:
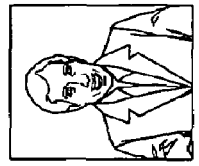
Figure 24G:
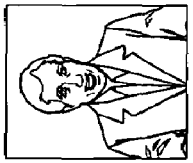

FIGS. 24A-G are simplified screen shots of an example pre-date phase to be used in the on-line dating service. FIGS. 24A-B illustrate a number of graphical depictions for determining availability, eating preferences, etc. the end users involved in this pre-date scenario. Once these items have been completed, a pre-date request is then sent to the platform. FIG. 24C illustrates an optional message (for a potential match) that can be included in the pre-date request. FIG. 24D illustrates what the dating counterpart would see after the pre-date request is sent. The end user receiving this message can elect to accept this date or the end user can suggest alternative locations for this meeting, which is further detailed by FIG. 24E. FIG. 24F illustrates a pre-date confirmation for these two parties. FIG. 24G illustrates the situation identified above, where a personal message has been provided ("Hey, let's meet . . . ) and the other party has the option of declining the invitation. In cases where the end user would not feel comfortable with a date at this point, she can elect to continue with the e-mailing process.

Some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that the FIGURES illustrate just one of a myriad of potential implementations of system 10.

Although the present invention has been described in detail with reference to particular embodiments, it should be understood that various other changes, substitutions, and alterations may be made hereto without departing from the spirit and scope of the present invention. For example, although the present invention has been described with reference to a dating protocol, any service that deals with (or that leverages) photos could readily benefit from the present invention.

Moreover, although the present invention has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in establishing a personality profile, in generating a pre-date profile, in executing relationship essentials, in answering short answer questions, any suitable question format can be employed. Example formats include a Yes/No format, a multiple choice question format, a short answer format, a true/false format, etc. Other formats can readily be used in order to achieve the desired responses.

Additionally, it should be noted that the dual-slider bar configuration (as depicted in FIGS. 21 and 23I) can be used in any segment of the on-line dating process. For example, such a dual-axis rating component may be used in the profile or feedback stages. Other operations of the platform could readily employ such an arrangement, whereby two items are evaluated together (one on the X-axis and another on the Y-axis).

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus that includes a processor and that is configured for exchanging data packets in a network environment, comprising:
   a search component configured to:
   execute a generic search based on preliminary information provided by the first end user such that generic matches to other end users are provided for the first end user; and
   execute a limited search based on additional information provided by the first end user that is different from the preliminary information, the limited search identifying additional matches that are different from the generic matches, wherein the generic matches and the additional matches are displayed for the first end user, wherein criteria for the limited search are separated into a first section and a second section, the first section including basic search criteria and the second section including advanced search criteria, and wherein an interest rating component is provided to allow the first end user to indicate a level of interest in one or more of the other end users.

2. The apparatus of claim 1, wherein the search component is provided as a graphical illustration that includes one or more pre-configured criteria for the first end user to select.

3. The apparatus of claim 1, wherein questions for the criteria are in a drop down selection format, a multiple choice question format, a true/false format, or a yes/no format.

4. The apparatus of claim 1, wherein selections of the questions are compiled and aggregated in order to identify trends for, or tendencies of, the first end user.

5. The apparatus of claim 1, further comprising:
   a server configured to interface with one or more end users and to manage information related to the one or more end users, wherein the search component is associated with a job seeking service, a person finder service, an athletic service, a real estate service, an academic service, a real estate finding service, an on-line dating service, or an escort service.

6. The apparatus of claim 1, wherein the queue of the first end user comprises a separate segment that includes profiles of individuals that have identified the first end user through the search component.

7. The apparatus of claim 1, wherein results of the search component are delivered to the first end user such that the first end user can evaluate the results.

8. The apparatus of claim 1, wherein usage of the limited search is restricted and includes usage terms that are different from usage terms of the generic search.

9. The apparatus of claim 1, wherein results from the search component are displayed to the first end user and the first end user is offered a limited ability to contact one or more of the end users identified by the search.

10. The apparatus of claim 1, wherein the search component is part of a server configured to manage a subscriber service associated with a plurality of end users in a network environment.

11. A computer implemented method involving a processor, comprising:
   executing a generic search based on preliminary information provided by the first end user such that generic matches to other end users are provided for the first end user; and
   executing a limited search based on additional information provided by the first end user that is different from the preliminary information, the limited search identifying additional matches that are different from the generic matches, wherein the generic matches and the additional matches are displayed for the first end user, wherein usage of the limited search is restricted and includes usage terms that are different from usage terms of the generic search, and wherein an interest rating component is provided to allow the first end user to indicate a level of interest in one or more of the other end users.

12. The method of claim 11, further comprising:
   providing a graphical illustration for searching activities that includes one or more pre-configured criteria for the first end user to select.

13. The method of claim 11, wherein criteria for the limited search are separated into a first section and a second section, the first section including basic search criteria and the second section including advanced search criteria, and wherein questions for the criteria are in a drop down selection format, a multiple choice question format, a true/false format, or a yes/no format.

14. The method of claim 13, wherein selections of the questions are compiled and aggregated in order to identify trends for, or tendencies of, the first end user.

15. The method of claim 11, further comprising:
   interfacing with one or more end users via a server; and
   managing information related to the one or more end users associated with a job seeking service, a person finder service, an athletic service, a real estate service, an academic service, a real estate finding service, an on-line dating service, or an escort service.

16. The method of claim 11, wherein results are delivered to the first end user such that the first end user can evaluate the results.

17. The method of claim 11, wherein results are displayed to the first end user and the first end user is offered a limited ability to contact one or more of the end users identified by the search.

18. Logic encoded in non-transitory media that includes code for execution and when executed by a processor is operable to perform operations comprising:
   executing a generic search based on preliminary information provided by the first end user such that generic matches to other end users are provided for the first end user; and
   executing a limited search based on additional information provided by the first end user that is different from the preliminary information, the limited search identifying additional matches that are different from the generic matches, wherein the generic matches and the additional matches are displayed for the first end user, wherein usage of the limited search is restricted and includes usage terms that are different from usage terms of the generic search, and wherein an interest rating component is provided to allow the first end user to indicate a level of interest in one or more of the other end users.

19. The logic of claim 18, the processor being further operable to perform operations comprising:
provdiing a graphical illustration for searching activities that includes one or more pre-configured criteria for the first end user to select wherein criteria for the limited search are separated into a first section and a second section, the first section including basic search criteria and the second section including advanced search criteria.

20. The logic of claim 19, wherein questions for the criteria are in a drop down selection format, a multiple choice question format, a true/false format, or a yes/no format, and wherein selections of the questions are compiled and aggregated in order to identify trends for, or tendencies of, the first end user.

21. The logic of claim 18, the processor being further operable to perform operations comprising:
interfacing with one or more end users via a server; and
managing information related to the one or more end users associated with a job seeking service, a person finder service, an athletic service, a real estate service, an academic service, a real estate finding service, an on-line dating service, or an escort service.

* * * * *